(12) United States Patent
Kato

(10) Patent No.: US 9,906,999 B2
(45) Date of Patent: Feb. 27, 2018

(54) COMMUNICATION TERMINAL AND ENCODING RATE REDUCTION METHOD

(71) Applicant: Panasonic Intellectual Property Management Co., Ltd., Osaka (JP)

(72) Inventor: Osamu Kato, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 130 days.

(21) Appl. No.: 14/256,701

(22) Filed: Apr. 18, 2014

(65) Prior Publication Data
US 2014/0219251 A1    Aug. 7, 2014

Related U.S. Application Data

(63) Continuation-in-part of application No. PCT/JP2011/005861, filed on Oct. 19, 2011.

(51) Int. Cl.
*H04W 36/02* (2009.01)
*H04W 36/00* (2009.01)

(52) U.S. Cl.
CPC ..... *H04W 36/023* (2013.01); *H04W 36/0066* (2013.01)

(58) Field of Classification Search
CPC ................ H04W 36/023; H04W 36/0066
USPC ........................................ 370/331
See application file for complete search history.

(56) References Cited

U.S. PATENT DOCUMENTS

| 6,252,898 B1* | 6/2001 | Eto ................ H04B 7/264 370/342 |
| 6,778,830 B1 | 8/2004 | Oizumi et al. |
| 2006/0034223 A1* | 2/2006 | Kim ................ H04W 52/146 370/331 |

(Continued)

FOREIGN PATENT DOCUMENTS

| JP | 2001-128209 A | 5/2001 |
| JP | 2006-303625 A | 11/2006 |

(Continued)

OTHER PUBLICATIONS

International Search Report dated Nov. 15, 2011, for corresponding International Application No. PCT/JP2011/005861, 4 pages.

*Primary Examiner* — Hassan Kizou
*Assistant Examiner* — Abdullahi Ahmed
(74) *Attorney, Agent, or Firm* — Seed IP Law Group LLP

(57) ABSTRACT

A communication terminal includes a communication unit to be connected to a first base station and a second base station in different communication protocols, and an encoder which encodes data at an encoding rate determined according to the first base station or the second base station for each predetermined time T and outputs the encoded data to the communication unit. When a connection destination is changed from the first base station to the second base station in a period when the communication unit is being connected to the first base station, the communication unit transmits change information to the encoder before the change of the connection to the second base station is completed. The encoder changes the encoding rate determined according to the first base station to the encoding rate determined according to the second base station when received the change information.

10 Claims, 13 Drawing Sheets

(56) References Cited

U.S. PATENT DOCUMENTS

| | | | |
|---|---|---|---|
| 2008/0039088 A1* | 2/2008 | Fukushima | H04W 36/06 455/436 |
| 2011/0080942 A1 | 4/2011 | Nagara et al. | |
| 2011/0149730 A1* | 6/2011 | Nemeth | H04L 43/0864 370/234 |
| 2012/0264434 A1* | 10/2012 | Zou | H04W 36/14 455/437 |
| 2015/0173063 A1* | 6/2015 | Oizumi | H04L 1/1861 370/242 |

FOREIGN PATENT DOCUMENTS

| | | |
|---|---|---|
| JP | 2006-345251 A | 12/2006 |
| JP | 2008-271336 A | 11/2008 |
| JP | 2010-087553 A | 4/2010 |
| JP | 2011-082837 A | 4/2011 |

\* cited by examiner

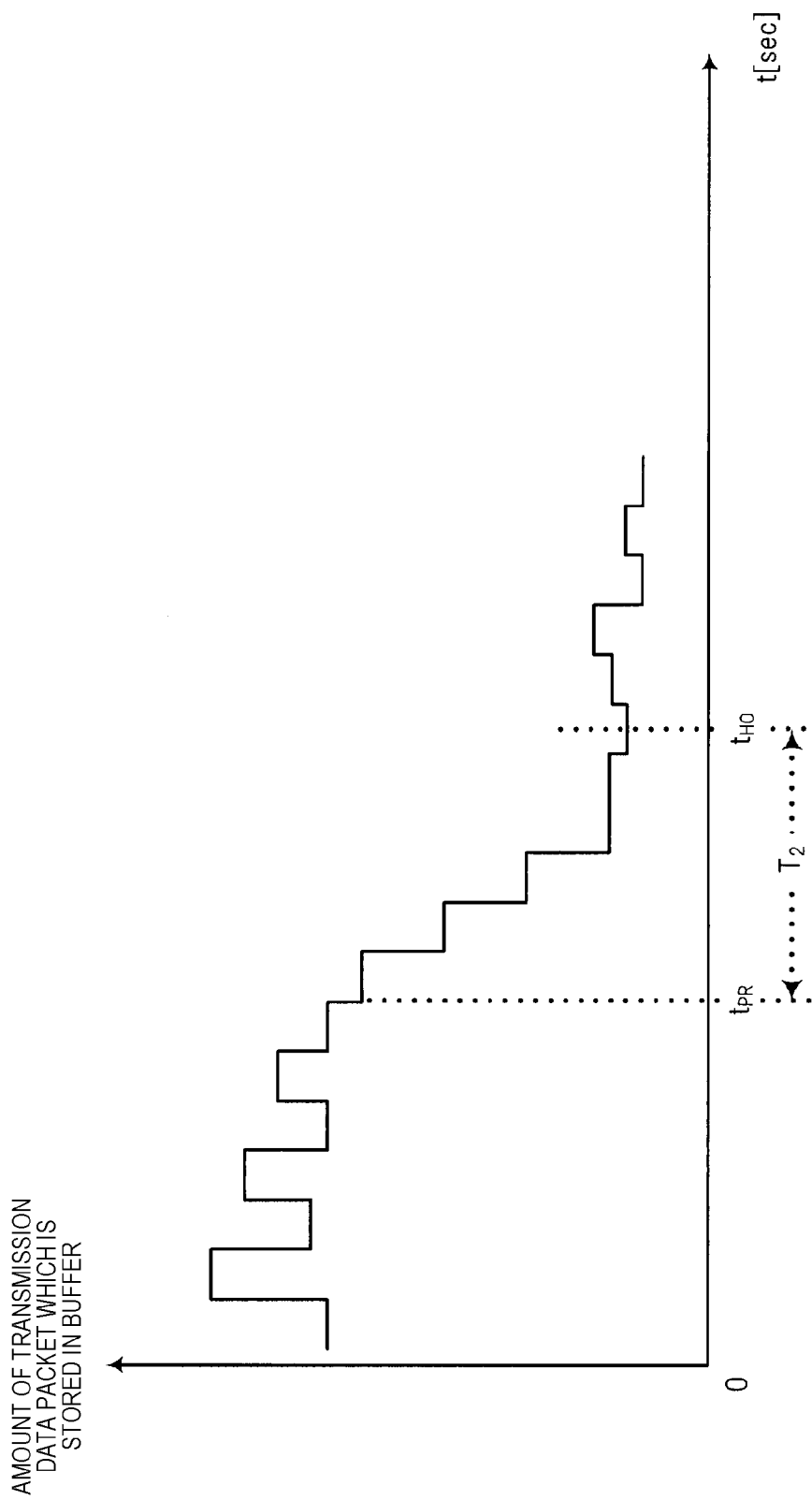

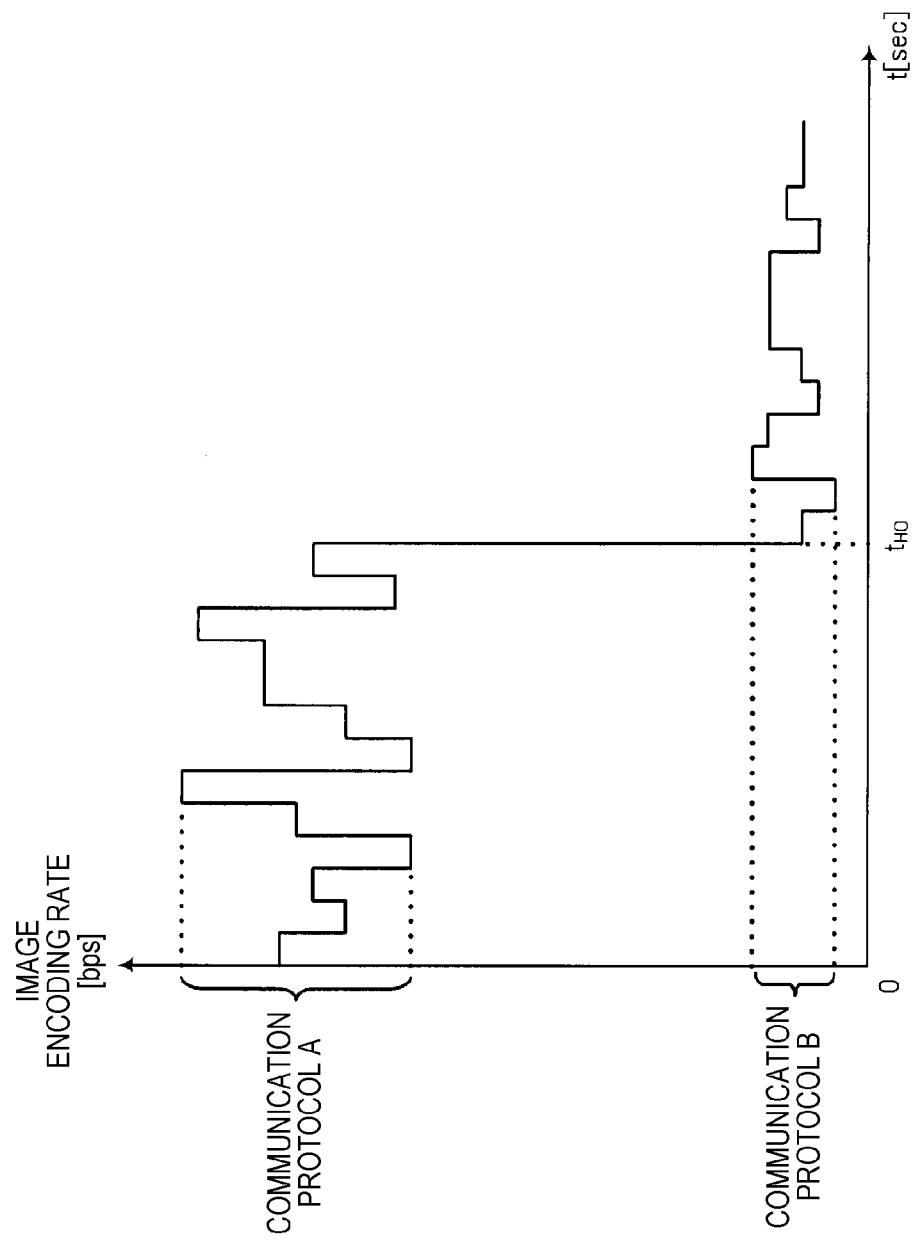

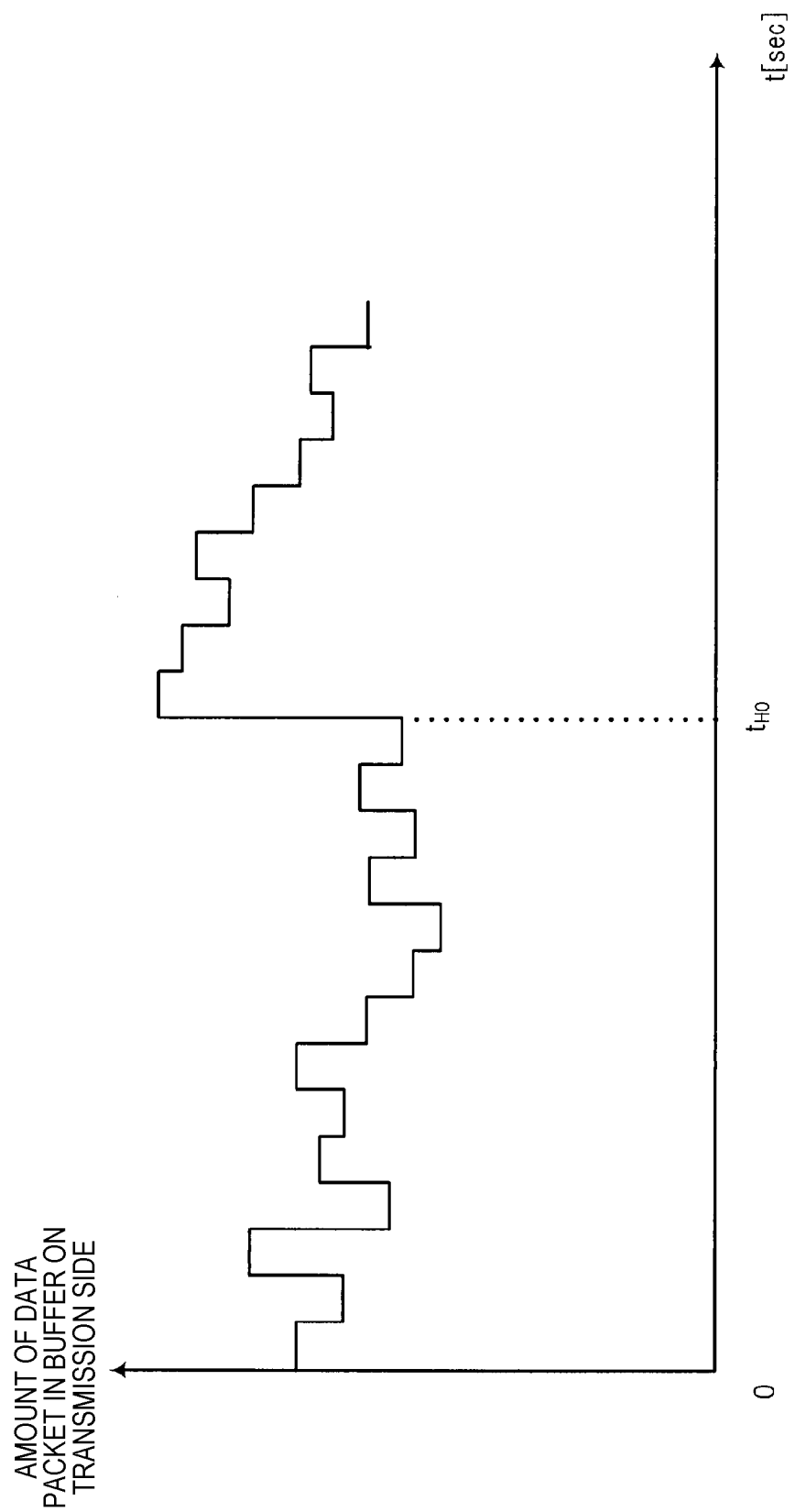

COMMUNICATION TERMINAL AND ENCODING RATE REDUCTION METHOD

BACKGROUND

1. Field of the Invention

The present invention relates to a communication terminal which is connectable to a plurality of base stations, and an encoding rate reduction method in the communication terminal.

2. Description of the Related Art

In recent years, in a cellular mobile communication network, with multimedia of information, in order to implement large-capacity data transmission, a technique which uses wireless communication in a high frequency band to implement a high transmission rate (communication speed) is actively studied.

In the cellular mobile communication network, for example, there are an LTE (Long Term Evolution) protocol, a W-CDMA (Wideband Code Division Multiple Access) protocol or a CDMA2000 protocol classified into 3G (3rd Generation), an HSPA (High Speed Packet Access) protocol classified into 3.5G, and a GSM (Registered Trademark) (Global System for Mobile Communication) protocol classified into 2G (2nd Generation). In the cellular mobile communication network, a plurality of mobile communication networks are mixedly used.

When one wireless communication mobile terminal (hereinafter, referred to as a "mobile terminal") is connectable to a plurality of different mobile communication networks, handover (heterogeneous network handover) between cells of different kinds of mobile communication networks may occur depending on quality of a communication channel to be used by the mobile terminal. The heterogeneous network handover is, for example, handover from a mobile communication network of LTE, in which communication is possible at a high transmission rate, to a mobile communication network of an HSPA protocol or a CDMA-EVDO (Evolution Data Only) protocol, in which communication is performed at a transmission rate lower than that of LTE, and is called Inter-RAT (Radio Access Technology) handover. Hereinafter, the heterogeneous network handover is referred to as "Inter-RAT handover" or "Inter-RAT HO".

For example, it is assumed that a mobile terminal which is transmitting image data for videoconference performs Inter-RAT handover from a mobile communication network of LTE, in which communication is possible at a high transmission rate, to a mobile communication network of an HSPA protocol, in which communication is performed at a transmission rate lower than that of LTE. In this case, a transmission rate which is usable for transmission of image data in the mobile terminal decreases from an average transmission rate (several Mbps to tens of Mbps, and for example, 10 Mbps) in the mobile communication network of LTE to an average transmission rate (hundreds of kbps to several Mbps, and for example, 1 Mbps) in the mobile communication network of HSPA.

In order to reduce flickering of a display image on a reception side with the decrease of the transmission rate which is usable for transmission of image data in the mobile terminal, for example, a transmission device and a transmission method shown in JP-A-2011-82837 are known.

With a decrease in wireless communication quality (for example, in JP-A-2011-82837, an error rate), when a wireless transmission rate which is usable for transmission of image data decreases, it is considered that the amount of data packets of encoded image data to be stored in a buffer increases while a high image encoding rate is maintained on a transmission side, a buffer overflow occurs, data stored in the buffer is not transmitted, and an image error occurs. For this reason, the transmission device shown in JP-A-2011-82837 immediately lowers an image encoding rate when the error rate as wireless communication quality is lower than a predetermined threshold value.

SUMMARY

JP-A-2011-82837 has no description relating to inter-RAT handover. If the control of the image encoding rate determined according to the error rate in JP-A-2011-82837 is applied to Inter-RAT handover, since inter-RAT handover allows change from LTE to HSPA, or the like and the image encoding rate largely changes compared to a case where the image encoding rate changes among the same communication protocols in the related art, immediately after inter-RAT handover is performed, the amount of data packets of encoded image data to be stored in the buffer on the transmission side temporarily increases. As a result, there is a problem in that a buffer overflow of encoded image data occurs on the transmission side, a data packet which continues to be stored in the buffer is not transmitted, and packet loss occurs.

A non-limited object of the present invention is to provide a communication terminal and an encoding rate reduction method which reduce the probability of packet loss even if a communication protocol is switched.

The present invention corresponds to a communication terminal to be connected to a first base station and a second base station performing a communication by a communication protocol different from that of the first base station, the communication terminal including: a communication unit to be connected to the first base station and the second base station; and an encoder which encodes data at an encoding rate determined according to the first base station or the second base station for each predetermined time and outputs the encoded data to the communication unit, wherein, when a connection destination is changed from the first base station to the second base station in a period when the communication unit is being connected to the first base station, the communication unit outputs change information including information relating to the second base station and representing a change of connection from the first base station to the second base station to the encoder before the change of the connection to the second base station is completed, and the encoder changes the encoding rate determined according to the first base station to an encoding rate determined according to the second base station when acquired the change information.

According to the present invention, it is possible to reduce the probability of packet loss even if a communication protocol is switched.

BRIEF DESCRIPTION OF THE DRAWINGS

FIG. 9 is a diagram showing a graph of an example of the amount of each transmission data packet which is stored in a buffer of a communication terminal according to the embodiment before the time $t_{PR}$, the time $t_{PR}$ to the time $t_{HO}$, and after the time $t_{HO}$.

FIG. 12 is a graph showing an image encoding rate on a transmission side before and after the time $t_{HO}$.

FIG. 13 is a graph showing the amount of data packets which are accumulated in a buffer on a transmission side before and after the time $t_{HO}$.

DETAILED DESCRIPTION

Figure 1:
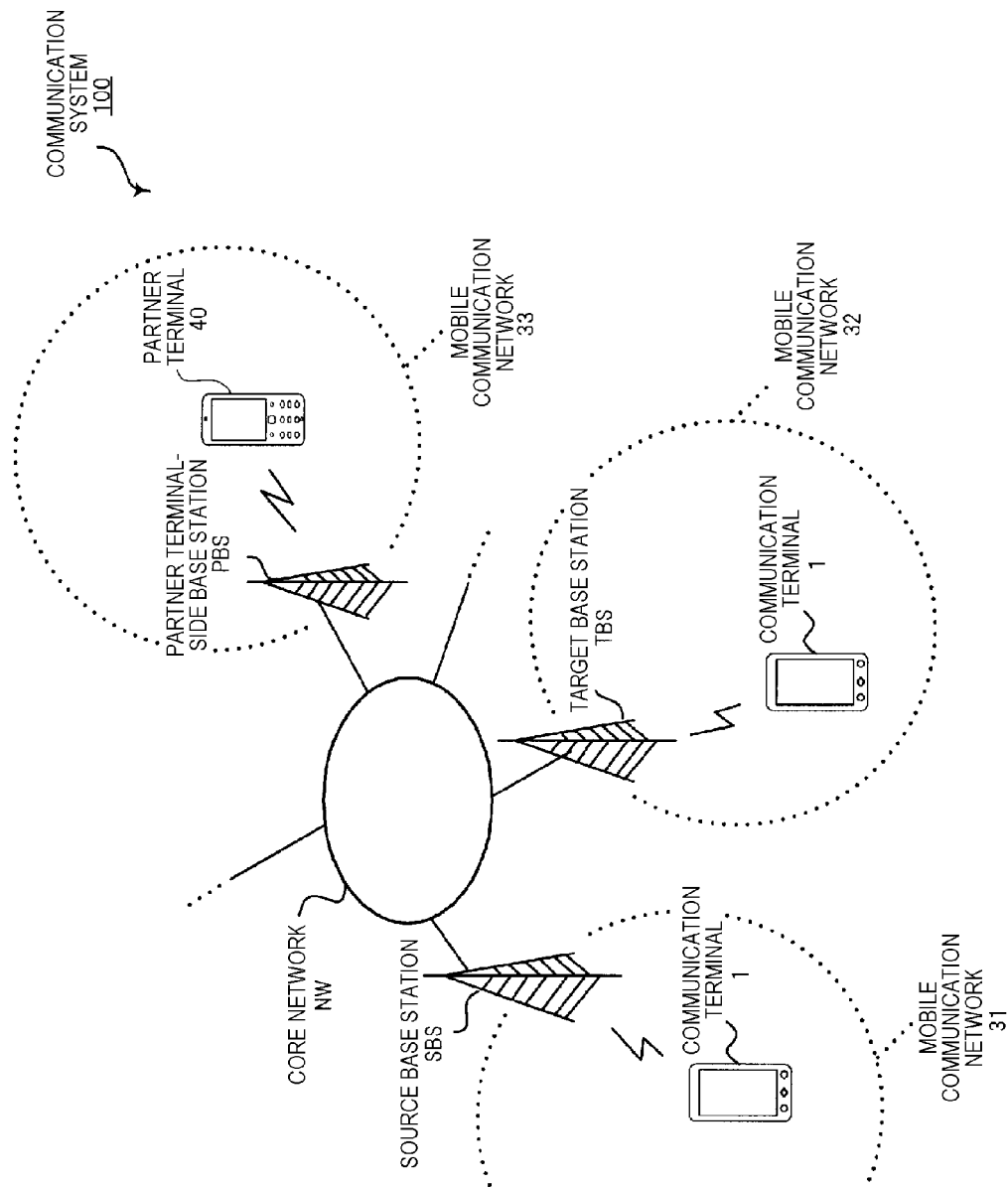
FIG. 1 is a system configuration diagram showing the system configuration of a communication system according to an embodiment.

First, prior to describing an embodiment of a communication terminal and an encoding rate reduction method according to the present invention, the above-described problem in the related art will be described in detail referring to FIGS. 12 and 13. FIG. 12 is a graph showing an image encoding rate on a transmission side before and after the time $t_{HO}$. FIG. 13 is a graph showing the amount of data packets which are accumulated in a buffer on a transmission side before and after the time $t_{HO}$. In FIGS. 12 and 13, the time $t_{HO}$ is the time at which an inter-RAT handover procedure ends, and it is assumed that a communication protocol A (for example: LTE) is switched to a communication protocol B (for example: HPSA) at the time $t_{HO}$.

A maximum transmission rate allocated to a terminal on a transmission side decreases from a maximum transmission rate corresponding to the communication protocol A to a maximum transmission rate corresponding to the communication protocol B by inter-RAT handover at the time $t_{HO}$.

The maximum transmission rate is the maximum value of a transmission rate permitted for each terminal in one base station, and an actual transmission rate becomes equal to or lower than the maximum transmission rate and changes depending on the congestion of communication.

The transmission side encodes image data at an image encoding rate within a range not exceeding the maximum transmission rate corresponding to the communication protocol A until inter-RAT handover is executed, stores a data packet of encoded image data in a buffer, and transmits the stored data packet to a reception side by the communication protocol A.

The image encoding rate is a rate after an image signal input from an imaging unit 11 is digitized and subjected to error correction. The rate should be equal to or lower than a maximum transmission rate which is required for a communication protocol, and changes depending on the congestion state of a communication channel (the congestion of communication).

Though not described in this embodiment, as in the related art, the image encoding rate is determined taking into consideration the congestion condition of the communication channel as well as the maximum transmission rate.

When inter-RAT handover is executed at the time $t_{HO}$, the transmission side encodes video data at an image encoding rate not exceeding the maximum transmission rate corresponding to the communication protocol B, stores a data packet of encoded image data in the buffer, and transmits the stored data packet to the reception side by the communication protocol B.

On the other hand, it is assumed that a data packet of encoded image data encoded immediately before the time $t_{HO}$ is output from the buffer at a transmission rate not exceeding the maximum transmission rate corresponding to the communication protocol A. For this reason, even if a data packet is output from the buffer at a transmission rate not exceeding the maximum transmission rate corresponding to the communication protocol B immediately after inter-RAT handover, a part of data packet among the stored data packets is not output from the buffer and is retained in the buffer.

As a result, as shown in FIG. 13, immediately after inter-RAT handover, the amount of data packets stored in the buffer temporarily increases, and a buffer overflow of encoded image data occurs. If a data packet which continues to be stored is not transmitted and is retained in the buffer, packet loss occurs in a transmission path from the transmission side to the reception side.

Hereinafter, an embodiment of a communication terminal and an encoding rate reduction method according to the present invention will be described referring to the drawings. Hereinafter, a communication terminal according to the present invention is, for example, a mobile phone and is not limited to a mobile phone, and a communication terminal may be, for example, a smartphone, a tablet terminal having a wireless communication function, a PDA (Personal Digital Assistant), or an electronic book terminal.

The present invention can be expressed as a mobile communication system which includes a wireless base station connected communicably with a communication terminal and the communication terminal, or a program for causing the communication terminal to operate as a computer, in addition to a communication terminal as a device. The present invention can be also expressed as a method including processing (steps) to be executed by the communication terminal.

(Communication System)

Hereinafter, the configuration of a mobile communication network 31 including a communication terminal 1 according to the embodiment, and a communication system 100 including a plurality of mobile communication networks 31 to 33, . . . will be described referring to FIG. 1. FIG. 1 is a configuration diagram showing the system configuration of the communication system 100 according to the embodiment. The communication system 100 shown in FIG. 1 has a configuration in which a plurality of mobile communication networks 31 to 33, . . . are connected through a core network NW. In the following description, for simplification of description, in the communication system 100 shown in FIG. 1, three mobile communication networks 31 to 33 are shown, and the communication system 100 includes, for example, three mobile communication networks 31 to 33.

Each of the mobile communication networks 31 to 33 is any one network among the networks using respective mobile communication techniques of, for example, an LTE protocol standardized in 3GPP (The 3rd Generation Partnership Project), a W-CDMA protocol or a CDMA2000 protocol classified into 3G, an HSPA protocol classified into 3.5G, and a GSM (Registered Trademark) protocol classified into 2G.

In each of the mobile communication networks 31 to 33, a wireless base station which relays communication with a communication terminal (for example, the communication terminal 1) allocated to be usable is provided. Specifically, a source base station SBS is provided in the mobile communication network 31, a target base station TBS is provided in the mobile communication network 32, and a partner terminal-side base station PBS is provided in the mobile communication network 33. The source base station SBS, the target base station TBS, and the partner terminal-side base station PBS may be a macro base station, a pico base station, or a femto base station.

Hereinafter, description will be provided assuming that a communication protocol when the communication terminal 1 performs wireless communication with the source base station SBS in the mobile communication network 31 is the communication protocol A (for example, an LTE protocol) and a communication protocol when the communication terminal 1 performs wireless communication with the target base station TBS in the mobile communication network 32 is the communication protocol B (for example, an HSPA protocol). In this embodiment, inter-RAT handover represents that the communication protocol allocated to the communication terminal 1 is switched from the communication protocol A of the mobile communication network 31 (LTE communication network) to the communication protocol B of the mobile communication network 32 (HSPA communication network) different from the communication protocol A.

The transmission rate of the communication terminal 1 allocated to be usable in the mobile communication network 31 using the LTE protocol is, for example, 10 Mbps (mega bit per second). The transmission rate of the communication terminal 1 allocated to be usable in the mobile communication network 32 using the HSPA protocol is, for example, 1 Mbps (mega bit per second).

The source base station SBS relays communication with the communication terminal 1 allocated to be usable in the mobile communication network 31, and performs communication with other mobile communication networks 32 and 33 through the core network NW. In this embodiment, before inter-RAT handover is executed, the source base station SBS serves as a connection base station which performs wireless communication with the communication terminal 1.

The source base station SBS receives a below-described channel quality measurement result from the communication terminal 1. Here, it is assumed that the channel quality measurement result, for example, the channel quality measurement result of a communication channel of the communication protocol A in the mobile communication network 31 provided by the source base station SBS is less than a predetermined threshold value, and the channel quality measurement result of a communication channel of the communication protocol B in the mobile communication network 32 provided by the target base station TBS exceeds the threshold value. In this case, the source base station SBS determines the communication protocol with the communication terminal 1, that is, the switching from the communication protocol A in the mobile communication network 31 provided by the source base station SBS to the communication protocol B in the mobile communication network 32 provided by the target base station TBS, that is, inter-RAT handover with respect to communication with the communication terminal 1.

After inter-RAT handover is determined, the source base station SBS transmits the occurrence of inter-RAT handover with respect to communication with the communication terminal 1 to the target base station TBS through the core network NW. That is, the occurrence of inter-RAT handover with respect to communication with the communication terminal 1 is shared between the source base station SBS and the target base station TBS.

The source base station SBS shares the occurrence of inter-RAT handover with respect to communication with the communication terminal 1 with the target base station TBS, generates inter-RAT handover information, and transmits the inter-RAT handover information to the communication terminal 1.

Here, the inter-RAT handover information is change information for changing a base station as a connection destination of the communication terminal 1 from the source base station SBS to the target base station TBS, and command information for instructing the execution of an inter-RAT handover procedure among the wireless communication unit 16, the source base station SBS, and the target base station TBS of the communication terminal 1. The command information further includes information relating to the communication protocol B, identification information of the target base station TBS as a new connection base station, and the like. Information relating to the communication protocol B is, for example, the protocol name (for example, the HSPA protocol) of the communication protocol B.

It is assumed that information relating to a maximum transmission rate $A_{max}$ of the communication protocol A, information relating to a maximum transmission rate $B_{max}$ of the communication protocol B, and information relating to the time $T_2$ necessary for the execution of the inter-RAT handover procedure are set as, for example, parameters of existing information in the image encoder 12 in advance. When information relating to the maximum transmission rate $A_{max}$ of the communication protocol A, information relating to the maximum transmission rate $B_{max}$ of the communication protocol B, and information relating to the time $T_2$ necessary for the execution of the inter-RAT handover procedure are not set as parameters of existing information in the communication terminal 1 in advance, these kinds of information may be included in the inter-RAT handover information.

Information relating to the maximum transmission rate $A_{max}$ of the communication protocol A, the maximum transmission rate $B_{max}$ of the communication protocol B, and the like may be generated by either the source base station SBS or the receiver 19 and transmitted. However, when information is generated by the source base station SBS and transmitted, since it is necessary to change the standard, such as 3GPP, it is easy for the receiver 19 to generate and transmit information.

After the inter-RAT handover information is generated and transmitted to the communication terminal 1, the source base station SBS executes the inter-RAT handover procedure among the communication terminal 1, the source base station SBS, and the target base station TBS. If the execution of the inter-RAT handover procedure ends, the connection base station of the communication terminal 1 becomes the target base station TBS, and the communication protocol, for which the communication terminal 1 is allocated to be usable, becomes the communication protocol B.

After the inter-RAT handover procedure ends, the target base station TBS allocates the communication terminal 1 as a terminal which is usable in the mobile communication network 32. The target base station TBS relays communication with the communication terminal 1 allocated to be usable in the mobile communication network 32, and performs communication with other mobile communication networks 31 and 33 through the core network NW. In this embodiment, after the inter-RAT handover is performed, the target base station TBS becomes a connection base station which performs wireless communication with the communication terminal 1.

The partner terminal-side base station PBS relays communication with the partner terminal 40 allocated to be usable in the mobile communication network 33, and performs communication with other mobile communication networks 31 and 32 through the core network NW. The partner terminal 40 is a terminal which becomes a communication partner of the communication terminal 1, and has the same configuration and operation as the communication terminal 1 described below.

(Communication Terminal)

Figure 2:
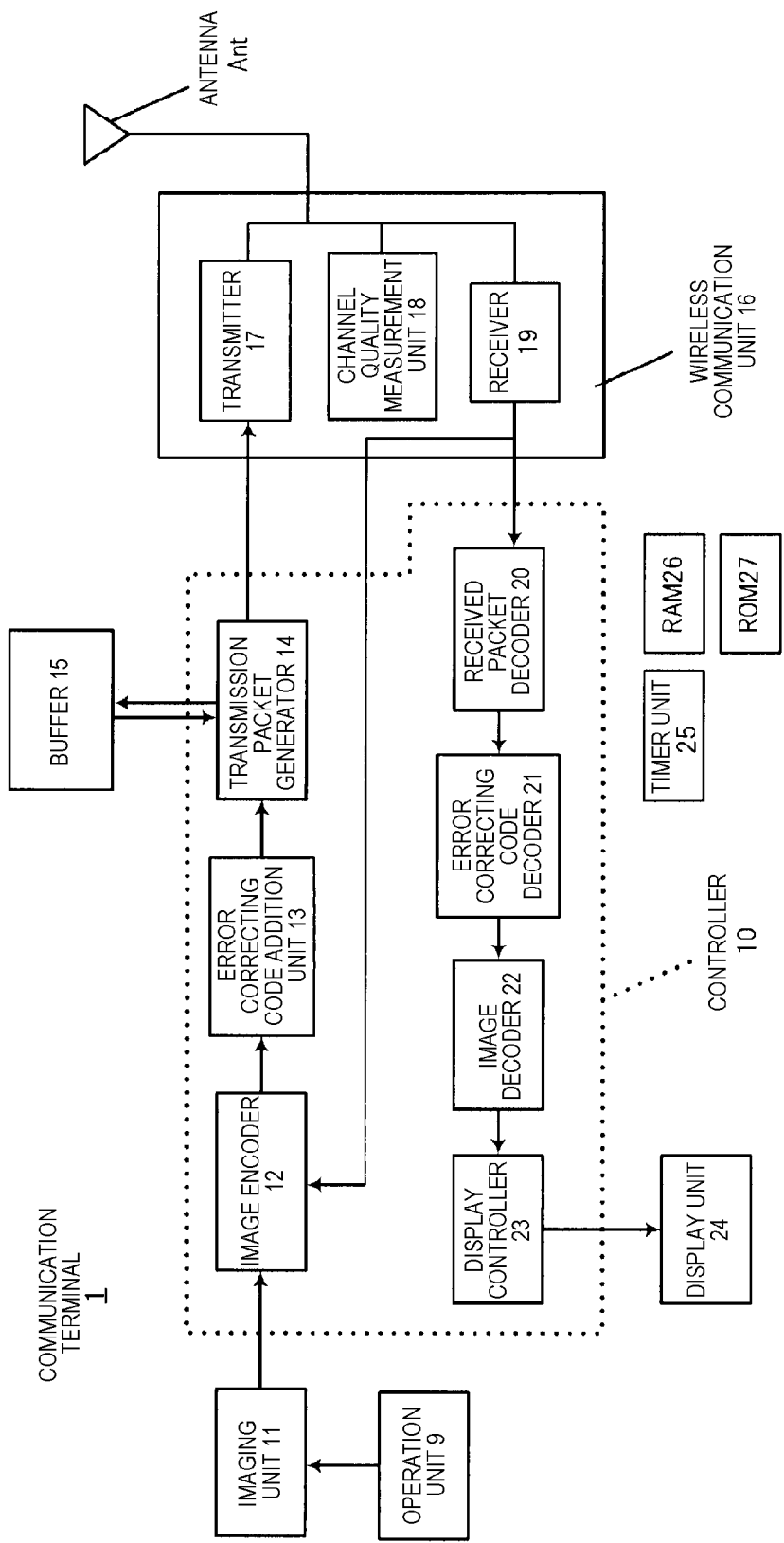
FIG. 2 is a block diagram showing the internal configuration of a communication terminal according to the embodiment.

Next, the configuration of a communication terminal 1 according to the embodiment will be described referring to FIG. 2. FIG. 2 is a block diagram showing the internal configuration of the communication terminal 1 according to the embodiment. The communication terminal 1 shown in FIG. 2 includes an operation unit 9, a controller 10, an imaging unit 11, a buffer 15, a wireless communication unit 16 to which an antenna Ant is connected, a display unit 24, a timer unit 25, a RAM (Random Access Memory) 26, and a ROM (Read Only Memory) 27. The controller 10 includes an image encoder 12, an error correcting code addition unit 13, a transmission packet generator 14, a received packet decoder 20, an error correcting code decoder 21, an image decoder 22, and a display controller 23. The respective units of the controller 10 are configured using a CPU (Central Processing Unit) embedded in the communication terminal 1. The wireless communication unit 16 includes a transmitter 17, a channel quality measurement unit 18, and a receiver 19.

Figure 3:
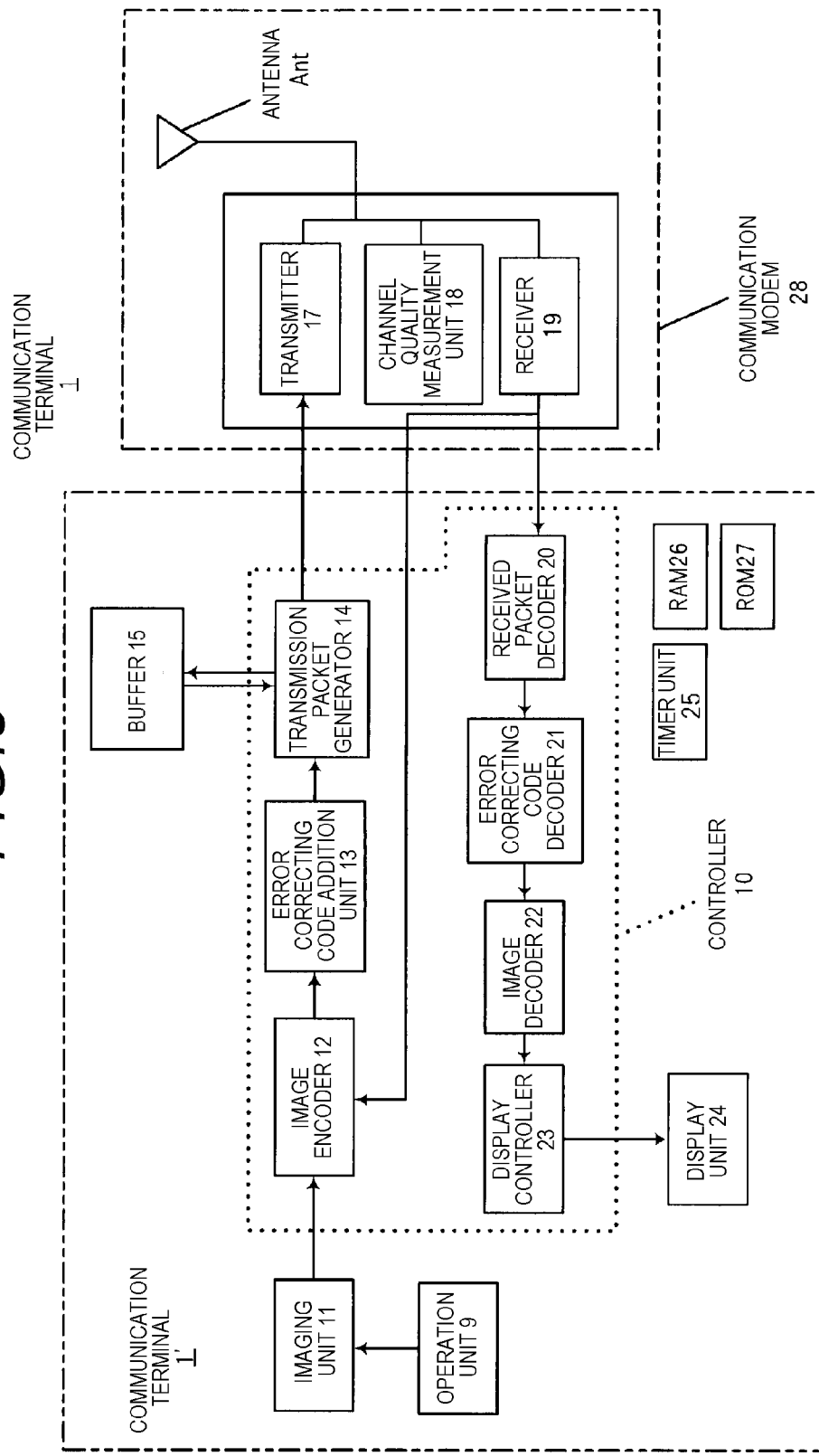
FIG. 3 is a block diagram showing the internal configuration of a communication terminal according to a modification example of the embodiment.

In FIG. 2, although the antenna Ant and the wireless communication unit 16 are included as a part of the configuration of the communication terminal 1, the antenna Ant and the wireless communication unit 16 may be configured separately from the communication terminal 1 (see FIG. 3). FIG. 3 is a block diagram showing the internal configuration of a communication terminal 1' of a modification example according to the embodiment. As shown in FIG. 3, a communication modem 28 as a communication unit including the configuration of the antenna Ant and the wireless communication unit 16 is connected to the communication terminal 1', and the same configuration as the communication terminal 1 shown in FIG. 2 is made. Hereinafter, although description will be provided assuming that the antenna Ant and the wireless communication unit 16 are included as a part of the configuration of the communication terminal 1 (see FIG. 2), the following description may be also applied to a case where the wireless communication unit 16 shown in FIG. 2 is replaced with the communication modem 28 shown in FIG. 3.

As the communication terminal 1', specifically, a notebook PC or the like is illustrated, and as the communication terminal 1 with the communication modem 28 connected by a USB, exchange of image data can be performed, and for example, a web conference can be performed.

In the communication terminal 1', the imaging unit 11 or the display unit 24 may be configured separately, and in this case, for example, when the main configuration of the communication terminal 1' is a TV conference system, the communication terminal 1' is a terminal body for a TV conference system, the imaging unit 11 is an external camera, and the display unit 24 becomes a TV.

The operation unit 9 is a user interface which is used when the user of the communication terminal 1 inputs operation on the communication terminal 1, and outputs an operation signal according to the operation content (for example, press of an imaging button) of the user to the imaging unit 11. When the communication terminal 1 is a mobile phone, the operation unit 9 may be configured to have various keys of numeric keys to input alphanumeric characters, a handset key to perform on-hook or off-hook, and function keys. For example, when the communication terminal 1 is a smartphone, the operation unit 9 is configured to have a touch panel which is arranged over the display unit 24 and can receive input operation by the finger of the user or a stylus pen. In FIG. 1, although an operation signal from the operation unit 9 is output to the imaging unit 11, an operation signal according to the operation content may be output to an application of the communication terminal 1 in accordance with the operation content of the user.

The imaging unit 11 is configured by an image sensor, such as a CCD (Charge Coupled Device) or a CMOS (Complementary Metal Oxide Semiconductor), which acquires image data of a still image or a motion image by imaging an object as a subject, and images the object as a subject in accordance with an operation signal output from the operation unit 9. The imaging unit 11 outputs image data acquired by imaging to the image encoder 12.

The image encoder 12 as an encoder acquires image data output from the imaging unit 11. Before the inter-RAT handover procedure is executed, the image encoder 12 determines an image encoding rate so as not to exceed the maximum transmission rate $A_{max}$ corresponding to the communication protocol A in the mobile communication network 31, and encodes image data at the determined image encoding rate.

The image encoder 12 acquires inter-RAT handover information output from the receiver 19. When the inter-RAT handover information is acquired, the image encoder 12 reduces the image encoding rate determined on the basis of the communication protocol A so as to become an image encoding rate within a range not exceeding the maximum transmission rate $B_{max}$ corresponding to the communication protocol B of the target base station TBS as a handover destination base station of the inter-RAT handover and the communication terminal 1 on the basis of the inter-RAT handover information.

The image encoder 12 reduces the image encoding rate before the time $T_2$ necessary for the execution of the inter-RAT handover procedure stored in the image encoder 12 elapses with the time $t_{PR}$, at which the inter-RAT handover information is acquired, as the starting point. A reduction method of the image encoding rate in the image encoder 12 will be described below referring to FIGS. 6 to 8.

As described above, when the time $T_2$ is not stored in the image encoder 12, the image encoding rate is reduced using information included in the inter-RAT handover information.

After the inter-RAT handover procedure is executed, the image encoder 12 determines an image encoding rate within a range not exceeding the maximum transmission rate $B_{max}$ corresponding to the communication protocol B of the target base station TBS as a new connection base station and the communication terminal 1, and encodes image data at the determined image encoding rate. The image encoder 12 outputs encoded image data to the error correcting code addition unit 13.

The error correcting code addition unit 13 acquires encoded image data output from the image encoder 12, and for example, when there is an error in a transmission data packet received by the partner terminal 40, adds a predetermined error correcting code for enabling correction of the error to encoded image data. For example, the predetermined error correction code is, but not limited to, a humming code or a Reed-Solomon code. The error correcting code addition unit 13 outputs encoded image data with the error correcting code to the transmission packet generator 14.

The transmission packet generator 14 acquires encoded image data with the error correcting code output from the error correcting code addition unit 13, and generates a transmission data packet to be transmitted through the antenna Ant. The transmission packet generator 14 temporarily stores the generated transmission data packet in the buffer 15. The transmission packet generator 14 reads the transmission data packet stored in the buffer 15 each time a predetermined time $T_1$ elapses and outputs the transmission data packet to the transmitter 17. The details of the parameter $T_1$ will be described below.

The buffer 15 temporarily stores the transmission data packet generated by the transmission packet generator 14. Before the inter-RAT handover procedure is executed, the transmission data packet stored in the buffer 15 is output to the transmission packet generator 14 each time the predetermined time $T_1$ elapses and is transmitted to the source base station SBS through the wireless communication unit 16 and the antenna Ant. After the inter-RAT handover procedure is executed, the transmission data packet stored in the buffer 15 is output to the transmission packet generator 14 each time the predetermined time $T_1$ elapses and is transmitted to the target base station TBS through the wireless communication unit 16 and the antenna Ant.

The transmitter 17 acquires the transmission data packet output from the transmission packet generator 14. Before the inter-RAT handover procedure is executed, the transmitter 17 modulates the transmission data packet in accordance with a predetermined modulation method and transmits the transmission data packet to the source base station SBS through the antenna Ant. After the inter-RAT handover procedure is executed, the transmitter 17 modulates the transmission data packet in accordance with a predetermined modulation method and transmits the transmission data packet to the target base station TBS through the antenna Ant.

Before the inter-RAT handover procedure is executed, the transmitter 17 modulates the channel quality measurement result relating to a communication channel of the communication protocol A output from the channel quality measurement unit 18 in accordance with a predetermined modulation method and transmits the channel quality measurement result to the source base station SBS through the antenna Ant. After the inter-RAT handover procedure is executed, the transmitter 17 modulates the channel quality measurement result relating to a communication channel of the communication protocol B output from the channel quality measurement unit 18 in accordance with a predetermined modulation method and transmits the channel quality measurement result to the target base station TBS through the antenna Ant.

Before the inter-RAT handover procedure is executed, the channel quality measurement unit 18 measures the channel quality relating to the communication channel of the communication protocol A on the basis of a reference signal received in the antenna Ant through a pilot channel. The channel quality measurement unit 18 outputs the channel quality measurement result relating to the communication channel of the communication protocol A to the transmitter 17. The reference signal may be received by the receiver 19 through the antenna Ant and then input to the channel quality measurement unit 18, or may be input directly to the channel quality measurement unit 18 through the antenna Ant.

After the inter-RAT handover procedure is executed, the channel quality measurement unit 18 measures the channel quality relating to the communication channel of the communication protocol B on the basis of the reference signal received in the antenna Ant through the pilot channel. The channel quality measurement unit 18 outputs the channel quality measurement result relating to the communication channel of the communication protocol B to the transmitter 17.

In this embodiment, the channel quality relating to the communication channel of the communication protocol A may include the communication channel of the communication protocol B between the target base station TBS, which provides the mobile communication network (for example, the mobile communication network 32) including a cell adjacent to a cell of the mobile communication network 31 provided by the source base station SBS, and the communication terminal 1, as well as the communication channel of the communication protocol A between the source base station SBS and the communication terminal 1.

Similarly, in this embodiment, the channel quality relating to the communication channel of the communication protocol B may include the channel quality of the communication protocol A between the source base station SBS, which provides the mobile communication network (for example, the mobile communication network 31) including a cell adjacent to a cell of the mobile communication network 32 provided by the target base station TBS, and the communication terminal 1, as well as the communication channel of the communication protocol B between the target base station TBS and the communication terminal 1.

When the communication protocol of the mobile communication network 31, in which the communication terminal 1 is allocated to be usable, is an LTE protocol, the channel quality measurement result of channel quality relating to a communication channel is RSRP (Reference Signal Received Power) or RSRQ (Reference Signal Received Quality). When the communication protocol of the mobile communication network 31, in which the communication terminal 1 is allocated to be usable, is a UTRA (UMTS Terrestrial Radio Access) protocol, the channel quality measurement result of channel quality relating to a communication channel is RSCP (Received Signal Code Power) or Ec/No (RSCP/RSSI (Received Signal Strength Indicator)).

When the communication protocol of the mobile communication network 31, in which the communication terminal 1 is allocated to be usable, is a GERAN protocol (GSM (Registered Trademark) EDGE Radio Access Network), the channel quality measurement result of channel quality relating to a communication channel is RSSI. When the communication protocol of the mobile communication network 31, in which the communication terminal 1 is allocated to be usable, is a CDMA2000 protocol, the channel quality measurement result of channel quality relating to a communication channel is a signal power value of a pilot signal.

Before the inter-RAT handover procedure is executed, the receiver 19 receives the transmission data packet transmitted from the source base station SBS through the antenna Ant as a received data packet. After the inter-RAT handover procedure is executed, the receiver 19 receives the transmission data packet transmitted from the target base station TBS through the antenna Ant as a received data packet. The receiver 19 demodulates the received data packet in accordance with a demodulation method corresponding to the modulation method on the transmission side and outputs the received data packet to the received packet decoder 20.

Before the inter-RAT handover procedure is executed, the receiver 19 detects the round-trip delay time (RTT: Round Trip Time) between the communication terminal 1, which performs communication with the partner terminal 40 by the communication protocol A through the source base station SBS, and the partner terminal 40.

After the inter-RAT handover procedure is executed, the receiver 19 detects the round-trip delay time (RTT: Round Trip Time) between the communication terminal 1, which performs communication with the partner terminal 40 by the communication protocol B through the target base station TBS, and the partner terminal 40.

The receiver 19 outputs information relating to the detected RTT to the image encoder 12.

Before the inter-RAT handover procedure is executed, the receiver 19 receives inter-RAT handover information (inter-RAT HO information) from the source base station SBS as a connection base station. The receiver 19 outputs the inter-RAT handover information to the image encoder 12. Hereinafter, the time at which the image encoder 12 acquires the inter-RAT handover information from the receiver 19 is set as the time $t_{PR}$. That is, the image encoder 12 recognizes the presence of the inter-RAT handover information at the time $t_{PR}$.

In the communication terminal 1 shown in FIG. 2 or 3, although the antenna Ant is configured as a single antenna, for example, the antenna Ant may be configured using three antennas of a transmission antenna corresponding to the transmitter 17, a monitor antenna corresponding to the channel quality measurement unit 18, and a reception antenna corresponding to the receiver 19. The antenna Ant is not limited to a single antenna or three antennas, and may be configured using an antenna element.

The received packet decoder 20 acquires the received data packet output from the receiver 19 and decodes the received data packet. The received packet decoder 20 outputs the decoded received data packet to the error correcting code decoder 21. The decoded received data packet includes encoded image data, and for example, when there is an error in the received data packet received by the communication terminal 1, a predetermined error correcting code for enabling correction of the error.

The error correcting code decoder 21 acquires encoded image data with the error correcting code output from the received packet decoder 20 and decodes the error correcting code from encoded image data with the error correcting code. When there is an error in encoded image data, the error correcting code decoder 21 corrects the error of encoded image data using the error correcting code and outputs encoded image data after correction to the image decoder 22. When there is no error in encoded image data, the error correcting code decoder 21 removes the error correcting code and outputs encoded image data to the image decoder 22.

The image decoder 22 acquires encoded image data output from the error correcting code decoder 21 and decodes acquired encoded image data. The image decoder 22 outputs decoded image data and a display instruction to display image data on the display unit 24 to the display controller 23.

The display controller 23 acquires image data and the display instruction output from the image decoder 22 and causes the display unit 24 to display image data on the basis of the display instruction.

The display unit 24 is configured using an LCD (Liquid Crystal Display) and displays image data decoded by the image decoder 22 under the control of the display controller 23.

The timer unit 25 is, for example, one of the functions of an OS (operating system) which operates the communication terminal 1 as a computer, and is a system clock (timepiece) of the communication terminal 1. An output signal of the timer unit 25, that is, time information of the communication terminal 1 is input to the respective units of the controller 10. The timer unit 25 may be configured so as to be included in the controller 10. In FIG. 2, an arrow from the timer unit 25 is not shown.

The RAM 26 is used for a work memory during the operations of the respective units of the communication terminal 1. In the communication terminal 1, the RAM 26 and the buffer 15 may be configured in common. In FIG. 2, an arrow to the RAM 26 is not shown.

The ROM 27 stores a program in which the operations of the respective units of the controller 10 of the communication terminal 1 are defined in advance. The respective units of the controller 10 may be configured by hardware or software. In particular, when the respective units of the controller 10 are configured by software, a CPU embedded in the communication terminal 1 reads the program, in which the operations of the respective units of the controller 10 are defined in advance, from the ROM 27, whereby the respective units of the controller 10 can be operated. In FIG. 2, an arrow to the ROM 27 is not shown.

Figure 4:
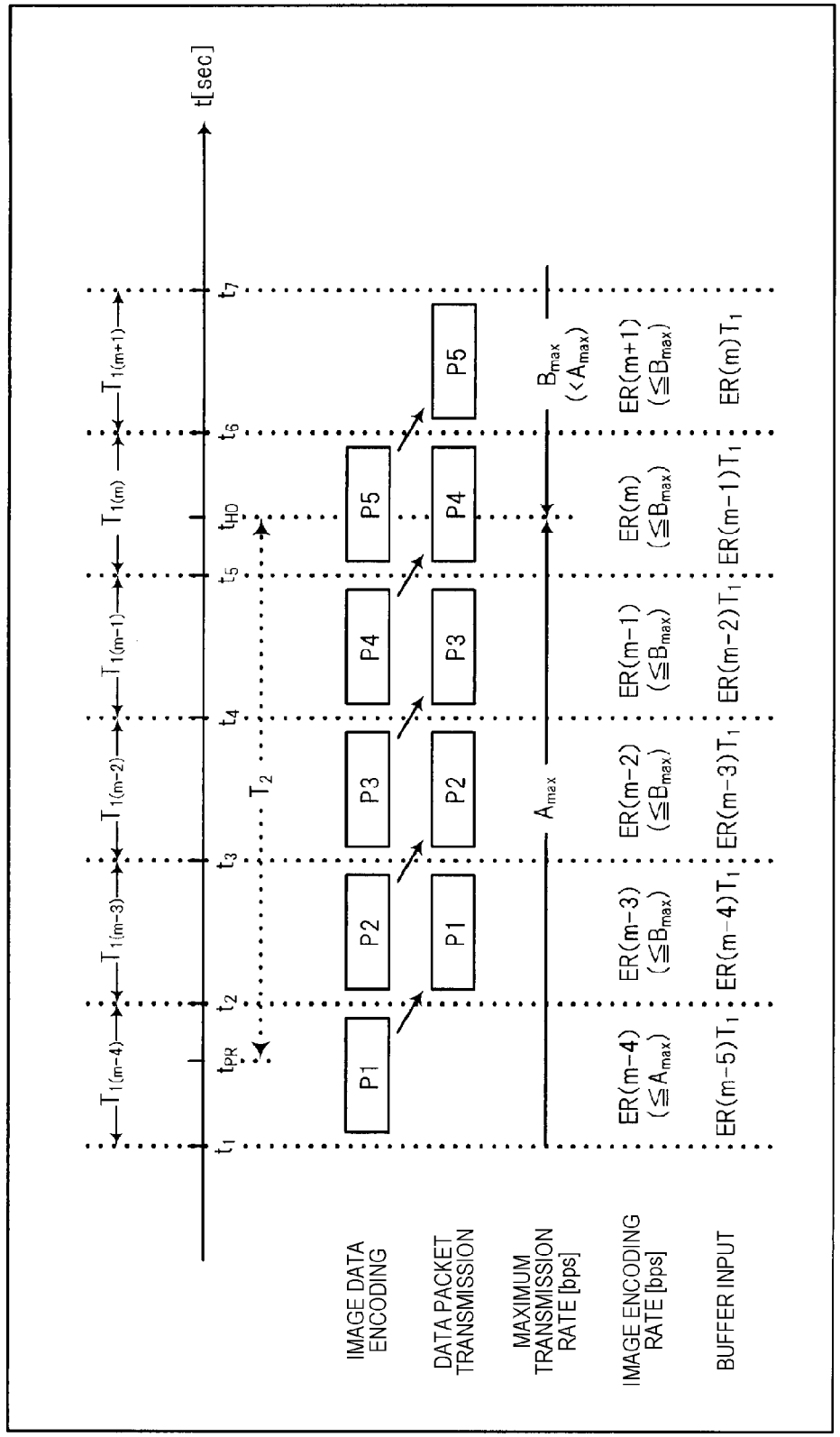
FIG. 4 is an explanatory view showing encoded image data to be encoded, transmission data packet to be transmitted, a communication protocol, and the amount of transmission data packets to be input to a buffer for each interval of a variable minimum unit time of an image encoding rate.

Next, the relationship among the parameters $T_1$ and $T_2$, the time $t_{PR}$, the time $t_{HO}$, the maximum transmission rate $A_{max}$, the maximum transmission rate $B_{max}$ and the transmission data packet input to and output from the buffer 15 will be described referring to FIG. 4. FIG. 4 is an explanatory view showing encoded image data, a transmission data packet to be transmitted, a communication protocol, and the amount of transmission data packets to be input to the buffer 15 for each interval of a variable minimum unit time of an image encoding rate.

The parameter $T_1$ is the variable minimum unit time (hereinafter, referred to as "image encoding rate minimum unit time") of the image encoding rate in the image encoder 12. That is, the image encoder 12 cannot change the image encoding rate for the time defined by the image encoding rate minimum unit time $T_1$. For example, when video data output from the imaging unit 11 has image data of 60 frames per second, the image encoding rate minimum unit time $T_1$ is the time at which the image encoding rate is not changed for the time corresponding to at least 10 frames and is set to 10×(1/60) (=about 167) [msec].

In FIG. 4, a (m−4)th image encoding rate minimum unit time $T_{1(m-4)}$ is from the time $t_1$ to the time $t_2$, a (m−3)th image encoding rate minimum unit time $T_{1(m-3)}$ is from the time $t_2$ to the time $t_3$, a (m−2)th image encoding rate minimum unit time $T_{1(m-2)}$ is from the time $t_3$ to the time $t_4$, a (m−1)th image encoding rate minimum unit time $T_{1(m-1)}$ is from the time $t_4$ to the time $t_5$, a m-th image encoding rate minimum unit time $T_{1(m)}$ is from the time $t_5$ to the time $t_6$, and a (m+1)th image encoding rate minimum unit time $T_{1(m+1)}$ is from the time $t_6$ to the time $t_7$. It is assumed that the parameter m is a natural number equal to or greater than 5.

As described above, the parameter $T_2$ represents the time necessary for the execution of the inter-RAT handover procedure. Specifically, the parameter $T_2$ is the time (for example, 600 [msec]) from when inter-RAT handover protocol processing starts until the inter-RAT handover protocol processing ends.

As described above, the parameter $t_{PR}$ represents the time at which the inter-RAT handover information transmitted from the source base station SBS is acquired by the image encoder 12. The parameter $t_{HO}$ represents the end time of the parameter $T_2$. Specifically, the parameter $t_{HO}$ represents the time at which the inter-RAT handover protocol processing ends. The maximum transmission rate in the communication terminal 1 is $A_{max}$ [bps] to the time $t_{HO}$ at which the inter-RAT handover protocol processing ends and the switching of the communication protocol from the communication protocol A to the communication protocol B ends. After the time $t_{HO}$ at which the inter-RAT handover protocol processing ends and the switching of the communication protocol from the communication protocol A to the communication protocol B ends, the maximum transmission rate in the communication terminal 1 is $B_{max}$ [bps].

In FIG. 4, it is assumed that, during the interval of the (m−4)th image encoding rate minimum unit time $T_{1(m-4)}$, the image encoder 12 acquires the inter-RAT handover information (the time t=$t_{PR}$), and during the interval of the m-th image encoding rate minimum unit time $T_{1(m)}$, the inter-RAT handover protocol processing ends (the time t=$t_{HO}$).

A transmission data packet of encoded image data P1 encoded by the image encoder 12 in the interval of the (m−4)th image encoding rate minimum unit time $T_{1(m-4)}$ is transmitted in the interval of the (m−3)th image encoding rate minimum unit time $T_{1(m-3)}$. A transmission data packet of encoded image data P2 encoded by the image encoder 12 in the interval of the (m−3)th image encoding rate minimum unit time $T_{1(m-3)}$ is transmitted in the interval of the (m−2)th image encoding rate minimum unit time $T_{1(m-2)}$. The same processing is repeated, and a transmission data packet of encoded image data P5 encoded by the image encoder 12 in the interval of the m-th image encoding rate minimum unit time $T_{1(m)}$ is transmitted in the interval of the (m+1)th image encoding rate minimum unit time $T_{1(m+1)}$.

The image encoding rate in the image encoder 12 becomes an image encoding rate ER(m−4) not exceeding the maximum transmission rate $A_{max}$ corresponding to the communication protocol A in the interval of the (m−4)th image encoding rate minimum unit time $T_{1(m-4)}$. The image encoding rate in the image encoder 12 becomes image encoding rates ER(m−3), ER(m−2), ER(m−1), ER(m), ER(m+1), . . . calculated for each image encoding rate minimum unit time and reduced directly so as not to exceed the maximum transmission rate $B_{max}$ corresponding to the communication protocol B in the intervals after the (m−3)th to (m+1)th, . . . image encoding rate minimum unit times $T_{1(m-3)}$ to $T_{1(m+1)}$, . . . corresponding to the next interval of the image encoding rate minimum unit time $T_{1(m-4)}$ including the time $t_{PR}$. Although these image encoding rates are an image encoding rate not exceeding the maximum transmission rate $B_{max}$ corresponding to the communication protocol B, it is ideally preferable that the image encoding rate is a value which is substantially equal to or smaller than the maximum transmission rate $B_{max}$ or the maximum transmission rate $B_{max}$ and is close to the maximum transmission rate $B_{max}$.

In this case, as shown in FIG. 4, the amount of encoded transmission data packet input to the buffer 15 becomes ER(m−5)$T_1$ in the interval of the (m−4)th image encoding rate minimum unit time $T_{1(m-4)}$, ER(m−4)$T_1$ in the interval of the (m−3)th image encoding rate minimum unit time $T_{1(m-3)}$, ER(m−3)$T_1$ in each interval of the (m−2)th image encoding rate minimum unit time $T_{1(m-2)}$, ER(m−2)$T_1$ in each interval of the (m−1)th image encoding rate minimum unit time $T_{1(m-1)}$, ER(m−1)$T_1$ in each interval of the m-th image encoding rate minimum unit time $T_{1(m)}$, and ER(m)$T_1$ in each interval of the (m+1)th image encoding rate minimum unit time $T_{1(m+1)}$.

However, the image encoding rate in the image encoder 12 may not be limited to the image encoding rate, which is calculated for each image encoding rate minimum unit time $T_1$ and reduced directly so as not to exceed the maximum transmission rate $B_{max}$ corresponding to the communication protocol B, in the intervals after (m−3)th image encoding rate minimum unit time $T_{1(m-3)}$ corresponding to the next interval of the image encoding rate minimum unit time $T_{1(m-4)}$ including the time $t_{PR}$. For example, as described below, the image encoding rate in the intervals after the (m−3)th image encoding rate minimum unit time $T_{1(m-3)}$ may be gradually reduced in a stepwise manner from the intervals of the (m−3)th to (m−1)th image encoding rate minimum unit times $T_{1(m-3)}$ to the interval of $T_{1(m-1)}$, and may be an image transmission rate not exceeding the maximum transmission rate $B_{max}$ corresponding to the communication protocol B at the (m−1)th image encoding rate minimum unit time $T_{1(m-1)}$.

Accordingly, unlike FIG. 4, the amount of encoded transmission data packet input to the buffer 15 becomes ER(m−5)$T_1$ and ER(m−4)$T_1$ in the intervals of the (m−4)th and (m−3)th image encoding rate minimum unit times $T_{1(m-4)}$ and $T_{1(m-3)}$, and becomes ER(m−3)$T_1$, ER(m−2)$T_1$, ER(m−1)$T_1$, and ER(m)$T_1$ at the image encoding rate minimum unit times $T_{1(m-2)}$ to $T_{1(m+1)}$ after the (m−2)th image encoding rate minimum unit time. The amount of encoded transmission data packet output from the buffer 15 is determined in accordance with an actual transmission rate upon the output from the buffer 15.

Figure 5:
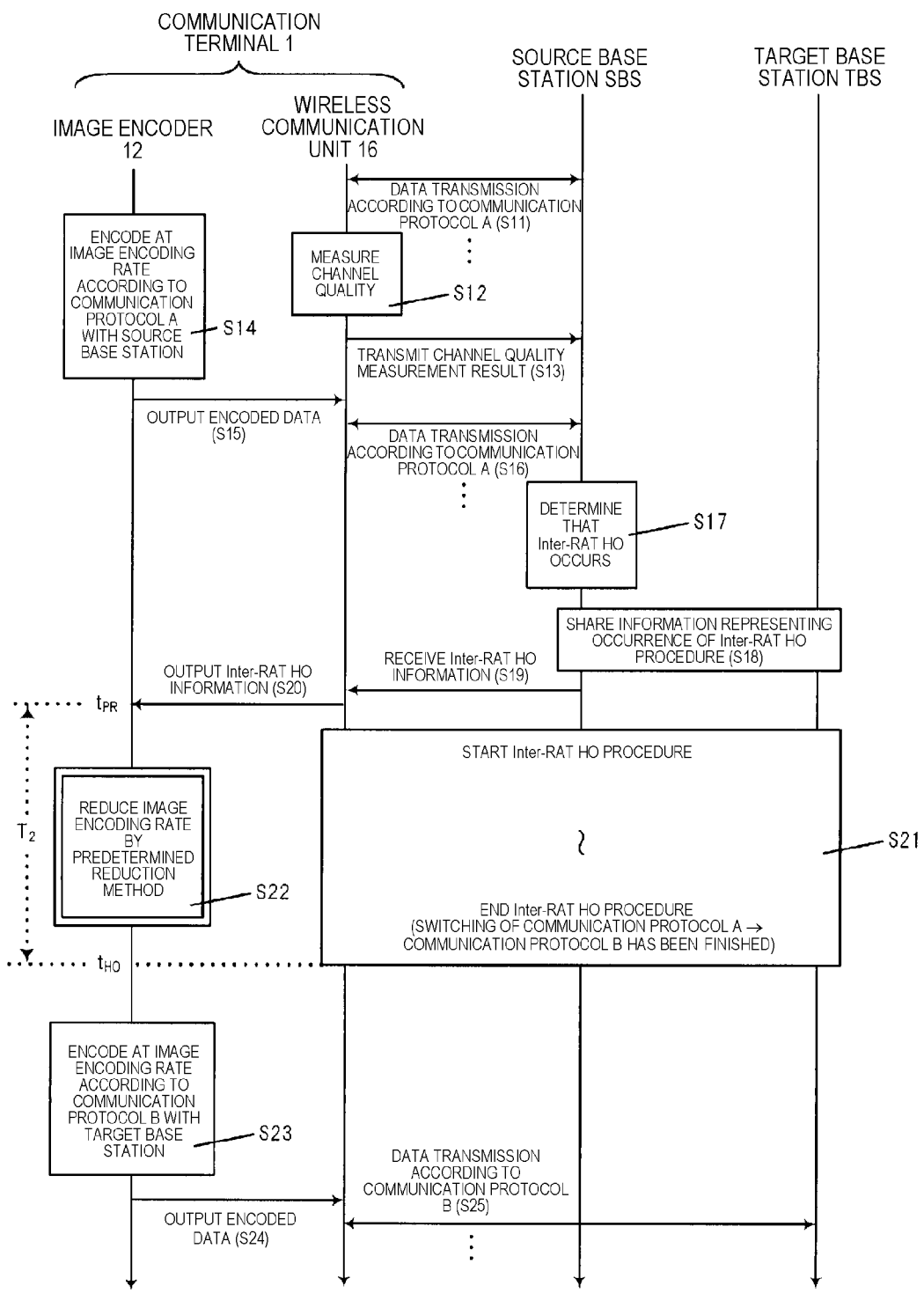
FIG. 5 is a sequence diagram illustrating exchange of signals relating to inter-RAT handover among a communication terminal according to the embodiment, a source base station, and a target base station.

Next, exchange of signals relating to inter-RAT handover between the communication terminal 1 and the source base station SBS in the mobile communication network 31 and the target base station TBS in the mobile communication network 32 will be described referring to FIG. 5. FIG. 5 is a sequence diagram illustrating exchange of signals relating to inter-RAT handover among the communication terminal 1 according to the embodiment, the source base station SBS, and the target base station TBS.

In the mobile communication network 31, data transmission is performed according to the communication protocol A in the mobile communication network 31 between the wireless communication unit 16 of the communication terminal 1 and the source base station SBS (S11). Though not shown in FIG. 5, the present invention is not limited to a case in Step S16 or Step S25 described below, and it is assumed that the same data transmission as Step S11 continues between the communication terminal 1 and the source base station SBS or the target base station TBS.

The channel quality measurement unit 18 of the wireless communication unit 16 measures channel quality relating to the communication channel of the communication protocol A on the basis of the reference signal received by the antenna Ant through the pilot channel (S12). The channel quality measurement unit 18 outputs the channel quality measurement result relating to the communication channel of the communication protocol A to the transmitter 17. The transmitter 17 transmits the channel quality measurement result output from the channel quality measurement unit 18 to the source base station SBS (S13).

The image encoder 12 encodes image data at the image encoding rate not exceeding the maximum transmission rate $A_{max}$ of the communication protocol A in the mobile communication network 31 separately from the operation of the wireless communication unit 16 described in Steps S12 and S13 (S14). Encoded image data encoded by the image encoder 12 is added with an error correcting code by the error correcting code addition unit 13 and is generated by the transmission packet generator 14 as a transmission data packet, and the transmission data packet is stored in the buffer 15.

The transmission data packet stored in the buffer 15 is output from the buffer 15 to the transmitter 17 of the wireless communication unit 16 in the interval of the image encoding rate minimum unit time $T_1$ next to the interval of the encoded image encoding rate minimum unit time $T_1$ (S15). The transmitter 17 transmits the transmission data packet to the source base station SBS through the antenna Ant. That is, in the mobile communication network 31, data transmission according to the communication protocol A in the mobile communication network 31 is performed between the wireless communication unit 16 of the communication terminal 1 and the source base station SBS (S16).

The source base station SBS receives the channel quality measurement result or the transmission data packet transmitted from the transmitter 17 of the wireless communication unit 16. Here, the channel quality measurement result is assumed that, for example, the channel quality measurement result of the communication channel of the communication protocol A in the mobile communication network 31 provided by the source base station SBS is less than a predetermined threshold value and the channel quality measurement result of the communication channel of the communication protocol B in the mobile communication network 32 provided by the target base station TBS exceeds the same threshold value. In this case, the source base station SBS determines the switching of the communication protocol with the communication terminal 1 from the communication protocol A in the mobile communication network 31 provided by the source base station SBS to the communication protocol B in the mobile communication network 32 provided by the target base station TBS, that is, the occurrence of inter-RAT handover with respect to communication with the communication terminal 1 (S17).

After the occurrence of inter-RAT handover is determined, the source base station SBS transmits the occurrence of inter-RAT handover with respect to communication with the communication terminal 1 to the target base station TBS through the core network NW. That is, the occurrence of inter-RAT handover with respect to communication with the communication terminal 1 is shared between the source base station SBS and the target base station TBS (S18).

After the occurrence of inter-RAT handover with respect to communication with the communication terminal 1 is shared between the source base station SBS and the target base station TBS, the source base station SBS generates inter-RAT handover information and transmits the inter-RAT handover information to the communication terminal 1 (S19). The receiver 19 of the wireless communication unit 16 outputs the inter-RAT handover information to the image encoder 12 (S20).

After the inter-RAT handover information is generated and transmitted to the communication terminal 1, the source base station SBS executes the inter-RAT handover procedure among the communication terminal 1, the source base station SBS, and the target base station TBS (S21). If the execution of the inter-RAT handover procedure ends, the connection base station of the communication terminal 1 becomes the target base station TBS, and the communication protocol, for which the communication terminal 1 is allocated to be usable, becomes the communication protocol B.

While the inter-RAT handover procedure is being executed among the wireless communication unit 16, the source base station SBS, and the target base station TBS, the image encoder 12 reduces the image encoding rate before the time $T_2$ necessary for the execution of the inter-RAT handover procedure included in the inter-RAT handover information elapses with the time $t_{PR}$, at which the inter-RAT handover information is acquired, as the starting point (S22). A reduction method of the image encoding rate in Step S22 may be a method which directly reduces the image encoding rate to the image transmission rate not exceeding the maximum transmission rate $B_{max}$ corresponding to the communication protocol B, or a method which reduces the image encoding rate in a stepwise manner as described below referring to FIG. 7 or 8.

After the time $t_{HO}$ at which the execution of the inter-RAT handover procedure ends, the image encoder 12 encodes image data at the image encoding rate not exceeding the maximum transmission rate $B_{max}$ corresponding to the communication protocol B in the mobile communication network 32 (S23). Encoded image data encoded by the image encoder 12 is added with an error correcting code by the error correcting code addition unit 13 and is generated by the transmission packet generator 14 as a transmission data packet, and the transmission data packet is stored in the buffer 15.

The transmission data packet stored in the buffer 15 is output from the buffer 15 to the transmitter 17 of the wireless communication unit 16 in the interval of the image encoding rate minimum unit time $T_1$ next to the interval of the encoded image encoding rate minimum unit time $T_1$ (S24). The transmitter 17 transmits the transmission data packet to the source base station SBS through the antenna Ant. That is, in the mobile communication network 32, data transmission according to the communication protocol B in the mobile communication network 32 is performed between the wireless communication unit 16 of the communication terminal 1 and the target base station TBS (S25).

Figure 6:
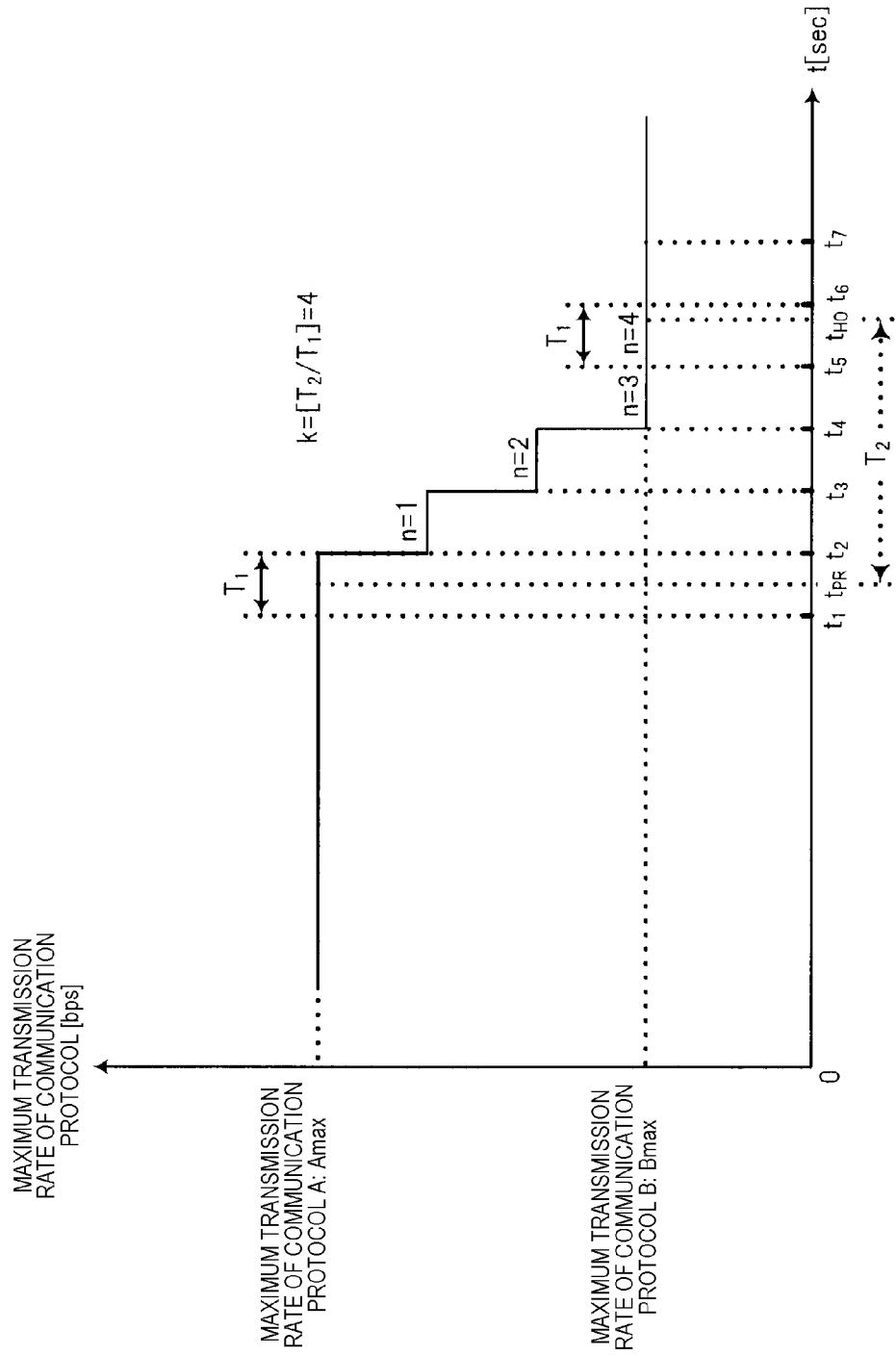
FIG. 6 shows a graph of a maximum transmission rate of a communication protocol before the time $t_{PR}$, the time $t_{PR}$ to the time $t_{HO}$, and after the time $t_{HO}$ in a communication terminal according to the embodiment.

Next, a reduction method of the image encoding rate by the image encoder 12 will be described referring to FIGS. 6 to 8. FIG. 6 is a diagram showing a graph of a maximum transmission rate of a communication protocol before the time $t_{PR}$, the time $t_{PR}$ to the time $t_{HO}$, and after the time $t_{HO}$ in the communication terminal 1 according to the embodiment. In FIG. 6, the horizontal axis represents time t [sec]

and the vertical axis represents a maximum transmission rate [bps] of a communication protocol of the communication terminal 1. FIG. 7 is a flowchart illustrating the details of a first reduction method of an image encoding rate in the communication terminal 1 according to the embodiment. FIG. 8 is a flowchart illustrating the details of a second reduction method of an image encoding rate in the communication terminal 1 according to the embodiment.

The image encoding rate changes within a range not exceeding the maximum transmission rate $A_{max}$ corresponding to the communication protocol A until the time $t_{PR}$. The image encoding rate is gradually reduced in a stepwise manner from a range of a value not exceeding the maximum transmission rate $A_{max}$ corresponding to the communication protocol A toward a range of a value not exceeding the maximum transmission rate $B_{max}$ corresponding to the communication protocol B until the time $t_{PR}$ to $t_{HO}$. The image encoding rate is within a range not exceeding the maximum transmission rate $B_{max}$ after the time $t_{HO}$. The times $t_1$ to $t_7$ shown in FIG. 6 are the same as the times $t_1$ to $t_1$ shown in FIG. 4.

That is, the reduction method of the image encoding rate shown in FIG. 4 changes the maximum transmission rate and thus reduces the image encoding rate, and is a method which directly reduces from the image encoding rate based on the maximum transmission rate $A_{max}$ in the image encoding rate minimum unit time $T_1$ including the time $t_{PR}$ to the image encoding rate ER(m−3) based on the maximum transmission rate $B_{max}$ of the new communication protocol B after the interval of the next image encoding rate minimum unit time $T_1$. Hereinafter, in addition to this reduction method, two reduction methods will be described. The number k (see the following description) of intervals which is common to the two reduction methods is represented by Mathematical Expression (1). In Mathematical Expression (1), [x] is a function for rounding a real number x off after the decimal point to calculate an integer value, and the parameter k is a natural number. The parameters $T_1$ and $T_2$ satisfy Mathematical Expression (2).

[Expression 1]

$$k = \left[\frac{T_2}{T_1}\right] \quad (1)$$

[Expression 2]

$$T_1 < T_2 \quad (2)$$

The first reduction method of the image encoding rate is a method which determines an available communication band of the image encoder 12, and is a method which changes the maximum transmission rate from the maximum transmission rate $A_{max}$, which corresponds to the communication protocol A and is allocated to the communication terminal 1, to the maximum transmission rate $B_{max}$, which corresponds to the communication protocol B and is allocated to the communication terminal 1, and thus gradually reduces the image encoding rate in a stepwise manner for each image encoding rate minimum unit time $T_1$. The details of the first reduction method will be described below referring to FIG. 7. According to the first reduction method, the image encoder 12 can calculate the maximum transmission rate for each image encoding rate minimum unit time $T_1$ quickly, and can calculate the image encoding rate using the maximum transmission rate.

The second reduction method of the image encoding rate is a method which, when varying the image encoding rate using the image encoding rate calculated on the basis of the round-trip delay time RTT to be estimated from the transmission data packet, gradually reduces the image encoding rate corresponding to the communication protocol A in the mobile communication network 31 in a stepwise manner for each image encoding rate minimum unit time $T_1$ on the basis of the image encoding rates ER(n) successively calculated for each image encoding rate minimum unit time $T_1$ and the maximum transmission rate $B_{max}$ of the communication protocol B. The details of the second reduction method will be described below referring to FIG. 8. According to the second reduction method, the image encoder 12 can appropriately the image encoding rate for each image encoding rate minimum unit time $T_1$ taking into consideration quality of a communication channel according to an actual congestion state of the core network NW.

The first reduction method obtains the maximum transfer rate (maximum transmission rate) at which the communication terminal 1 can perform communication at a certain time, and encoding is performed such that the image encoding rate becomes equal to or lower than the maximum transfer rate. The second reduction method directly obtains the image encoding rate at a certain time.

First, the first reduction method of the image encoding rate will be described referring to FIG. 7. In FIG. 7, the image encoder 12 performs timer reset on an output from the timer unit 25 (S31), and subsequently recognizes the elapse (of the interval) of the image encoding rate minimum unit time $T_1$ on the basis of the output from the timer unit 25 (S32). If the inter-RAT handover information is acquired from the receiver 19 (S33, YES), the image encoder 12 sets the time t=$t_{PR}$ on the basis of the output from the timer unit 25 (S34). When the image encoder 12 does not acquire the inter-RAT handover information from the receiver 19 (S33, NO), the processing of the image encoder 12 does not progress to Step S34, and the image encoding rate of the image encoder 12 is set within a range not exceeding the maximum transmission rate $A_{max}$ corresponding to the communication protocol A.

The image encoder 12 calculates the number k of interval from the same interval next to the interval of the image encoding rate minimum unit time $T_1$ including the time $t_{PR}$ to the same interval including the time $t_{HO}$ when the time $T_2$ ends by Mathematical Expression (1) until the time $T_2$ included in the inter-RAT handover information elapses with the time $t_{PR}$ as the starting point (S35).

The image encoder 12 initializes the parameter n (S36), and calculates the maximum transmission rate $A'_{max}(n)$ necessary when calculating the image encoding rate in the same interval next to the interval of the image encoding rate minimum unit time $T_1$ including the time $t_{PR}$ by Mathematical Expression (3) (S37). The parameter n is a natural number of 1 to k, and in the example of FIG. 6, since k=4, the parameter is 1, 2, 3, and 4. The image encoder 12 acquires information relating to the maximum transmission rate $A_{max}$ for the communication protocol A, the maximum transmission rate $B_{max}$ for the communication protocol B, and the time $T_2$ necessary for the execution of the inter-RAT handover procedure.

[Expression 3]

$$A'_{max}(n) = A_{max} - \frac{n}{k}(A_{max} - B_{max}) \qquad (3)$$

The image encoder 12 calculates the image encoding rate ER(n) in the interval of the n-th image encoding rate minimum unit time $T_1$ within a range not exceeding A'max (n) calculated in Step S37 (S38), and encodes image data from the imaging unit 11 at the calculated image encoding rate ER(n). After Step S38, it is asked whether or not the parameter n reaches the maximum value k (S39). When the parameter n reaches the maximum value k (S39, YES), the processing of the flowchart of FIG. 7 ends. When the parameter n does not reach the maximum value k (S39, NO), the parameter n is incremented (S40), and the process progresses to the processing of Step S37.

In the case of Mathematical Expression (3), since the image encoding rate is determined using a maximum transmission rate of a communication protocol, the image encoding rate does not reflect an actual channel condition. For this reason, in addition to Mathematical Expression (3), it is preferable to determine the image encoding rate on the basis of the image encoding rate using the RTT as normal.

Next, the second reduction method of the image encoding rate will be described referring to FIG. 8. In FIG. 8, the image encoder 12 performs timer reset on the output from the timer unit 25 (S31), and subsequently recognizes the elapse (of the interval) of the image encoding rate minimum unit time $T_1$ on the basis of the output from the timer unit 25 (S32). The image encoder 12 acquires the RTT from the receiver 19 each time the image encoding rate minimum unit time $T_1$ elapses, and calculates the image encoding rate ER on the basis of the acquired RTT for each image encoding rate minimum unit time $T_1$.

When the inter-RAT handover information is acquired from the receiver 19 (S33, YES), the image encoder 12 sets the time $t=t_{PR}$ on the basis of the output from the timer unit 25 (S34). When the image encoder 12 does not acquire the inter-RAT handover information from the receiver 19 (S33, NO), the processing of the image encoder 12 does not progresses to Step S34, and the image encoding rate of the image encoder 12 is calculated as normal.

The image encoder 12 calculates the number k of interval from the same interval next to the interval of the image encoding rate minimum unit time $T_1$ including the time $t_{PR}$ to the same interval including the time $t_{HO}$ when the time $T_2$ ends by Mathematical Expression (1) until the time $T_2$ included in the inter-RAT handover information elapses with the time $t_{PR}$ as the starting point (S35).

The image encoder 12 acquires information relating to the maximum transmission rate $A_{max}$ for the communication protocol A and information relating to the maximum transmission rate $B_{max}$ for the communication protocol B. The image encoder 12 initializes the parameter n (S36), and calculates the image encoding rate ER'(n) in the same interval next to the image encoding rate minimum unit time $T_1$ including the time $t_{PR}$ by Mathematical Expression (4) (S47). In Mathematical Expression (4), the image encoding rate ER(n) represents the image encoding rate calculated by the same computational expression as normal other than during Inter-RAT HO on the basis of the previous image encoding rate ER(n−1), the RTT received from the receiver 19, and the maximum transmission rate $A_{max}$. ER(0) when n=1 represents the image encoding rate in the interval of the image encoding rate minimum unit time $T_1$ including the time $t_{PR}$.

[Expression 4]

$$ER'(n) = \min\left[ER(n), ER(n) - \frac{n}{k}\{ER(n) - B_{max}\}\right] \qquad (4)$$

The image encoder 12 sets ER'(n) calculated in Step S47 as the image encoding rate in the interval of the n-th image encoding rate minimum unit time $T_1$ (S48), and encodes image data from the imaging unit 11 at the calculated image encoding rate ER'(n). After Step S48, it is asked whether or not the parameter n reaches the maximum value k (S39). When the parameter n reaches the maximum value k (S39, YES), the processing of the flowchart of FIG. 8 ends. When the parameter n does not reach the maximum value k (S39, NO), the parameter n is incremented (S40), and the process progresses to the processing of Step S37.

FIG. 9 is a diagram showing a graph of an example of the amount of each transmission data packet which is stored in the buffer 15 of the communication terminal 1 according to the embodiment before the time $t_{PR}$, the time $t_{PR}$ to the time $t_{HO}$, and after the time $t_{HO}$. Before the time $t_{PR}$, encoding is performed at the image encoding rate not exceeding the maximum transmission rate $A_{max}$ of the communication protocol A, and a lot of transmission data packets are stored in the buffer 15.

Figure 7:
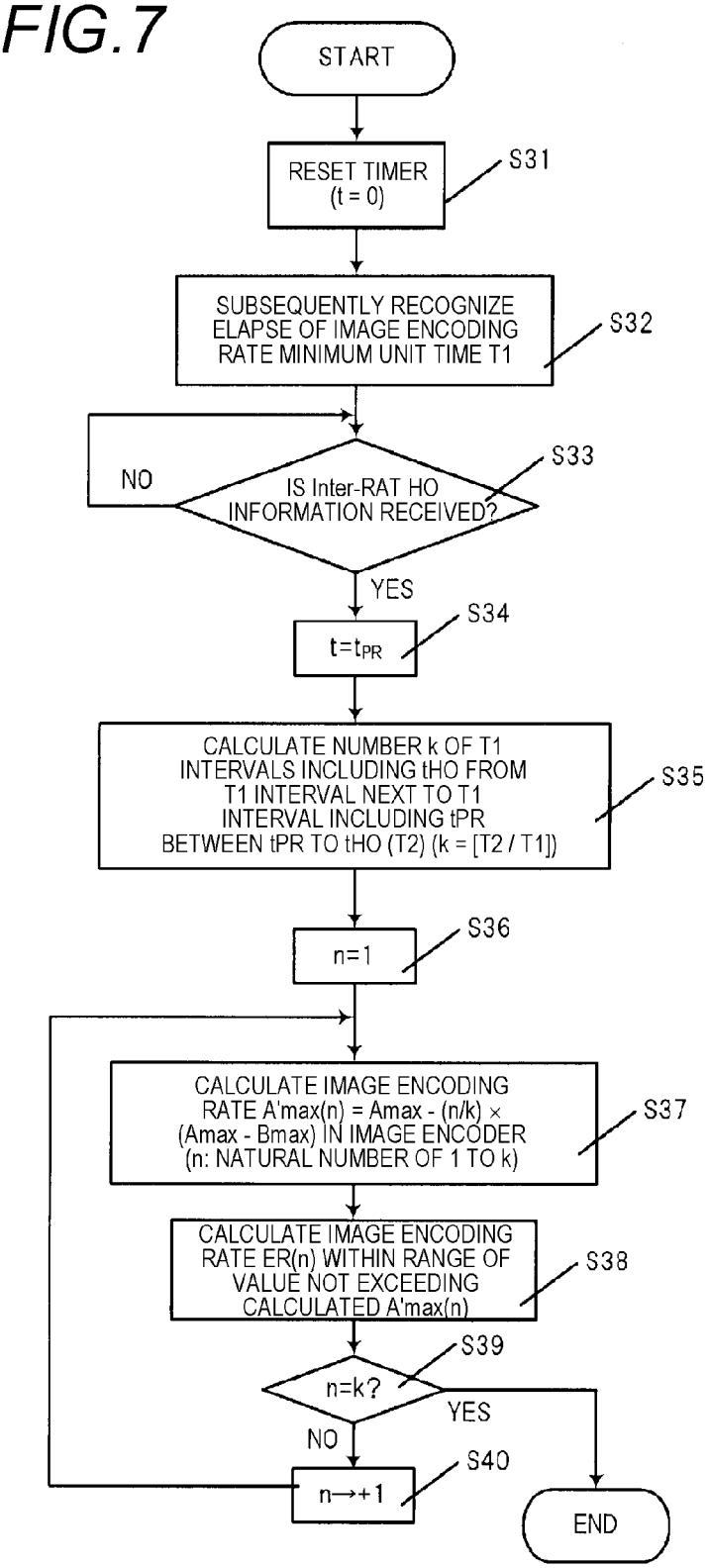
FIG. 7 is a flowchart illustrating the details of a first reduction method of an image encoding rate in a communication terminal according to the embodiment.
Figure 8:
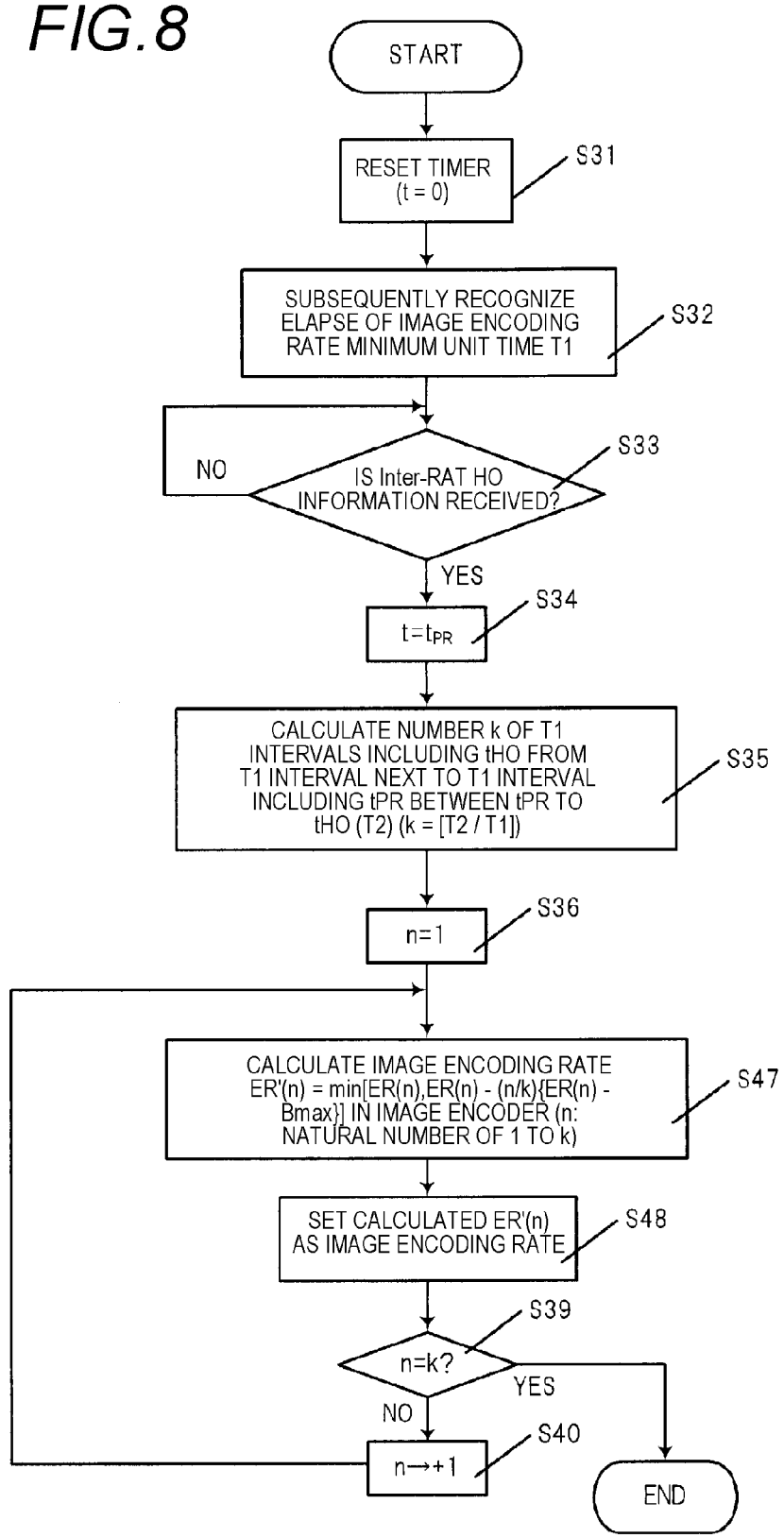
FIG. 8 is a flowchart illustrating the details of a second reduction method of an image encoding rate in a communication terminal according to the embodiment.

During the time $t_{PR}$ to the time $t_{HO}$, the image encoding rate is gradually reduced in a stepwise manner from the image encoding rate not exceeding the maximum transmission rate $A_{max}$ corresponding to the communication protocol A toward the image encoding rate not exceeding the maximum transmission rate $B_{max}$ corresponding to the communication protocol B (see FIG. 7 or 8). For this reason, the amount of transmission data packets stored in the buffer 15 is gradually reduced in a stepwise manner from the time $t_{PR}$ toward the time $t_{HO}$. After the time $t_{HO}$, encoding is performed at the image encoding rate not exceeding the maximum transmission rate $B_{max}$ of the communication protocol B, and a smaller amount of transmission data packets than before the time $t_{PR}$ are stored in the buffer 15.

With the above, the communication terminal 1 according to the embodiment can suppress the occurrence of retention of transmission data packets stored in the buffer 15 and can reduce the probability of packet loss caused by retention of transmission data packets even after if inter-RAT handover is performed with a transmission rate usable for data transmission lower than a current transmission rate.

Although the embodiment has been described referring to the drawings, it is needless to say that the present invention is not limited to this example. It is obvious that a person skilled in the art can attain modification examples, alteration examples, and further combination examples of various embodiments within the scope described in the appended claims, and it is understood that these examples certainly belong to the technical scope of the present invention.

Although the image encoding rate in the above-described image encoder 12 can be implemented by any reduction method among the above-described reduction methods, for example, the image encoding rate may be implemented by the following reduction method. Specifically, the image encoder 12 has the values of a plurality of image encoding rates restrictively designated in advance, and determines the image encoding rate to a candidate image encoding rate closest to an image encoding rate satisfying a value obtained by the first reduction method or the second reduction method or an image encoding rate equal to or smaller than the calculated value of an image encoding rate satisfying the obtained value and closest to the values of a plurality of image encoding rates.

Figure 10A:
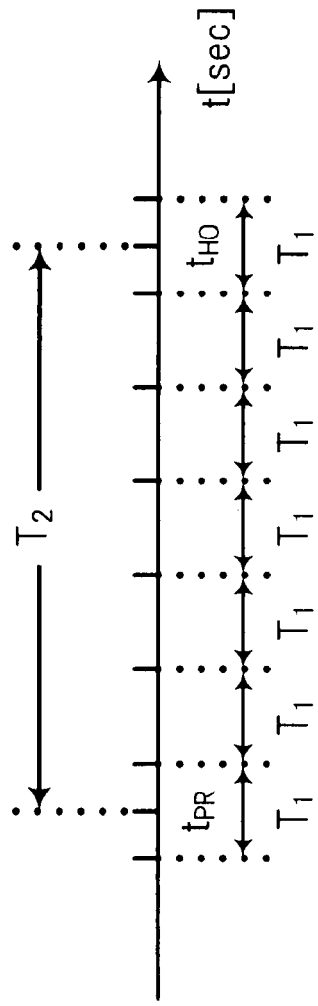
FIG. 10A is a diagram showing the relationship between the time $T_2$ and a variable minimum unit time $T_1$ of an image encoding rate when the time $T_2$ is sufficiently longer than the image encoding rate minimum unit time $T_1$.

In the above-described embodiment, a case where the time $T_2$ necessary for the execution of the inter-RAT handover procedure is significantly greater than the image encoding rate minimum unit time $T_1$ has been described (see FIG. 10A). FIG. 10A is a diagram showing the relationship between the time $T_2$ and the variable minimum unit time $T_1$ of the image encoding rate when the time $T_2$ is sufficiently longer than the image encoding rate minimum unit time $T_1$. FIG. 10A shows an example where the parameter k=6.

As in the above-described embodiment, when the parameter k is a natural number equal to or greater than 3, the image encoder 12 calculates an image encoding rate in the interval of the n-th image encoding rate minimum unit time $T_1$ for each image encoding rate minimum unit time $T_1$ by Mathematical Expression (3) or Mathematical Expression (4), and encodes image data using the calculated image encoding rate.

As in the above-described embodiment, when the parameter k=2, the image encoder 12 determines the image encoding rates ER(1) and ER(2) in the intervals of the first and second image encoding rate minimum unit times $T_1$ to the image encoding rate not exceeding the maximum transmission rate $B_{max}$ corresponding to the communication protocol B without using Mathematical Expression (3) or Mathematical Expression (4), and encodes image data at the determined image encoding rate.

When the parameter k is a natural number less than 2, that is, 1, the image encoder 12 sets the image encoding rate ER(1) in the same interval next to the interval of the image encoding rate minimum unit time $T_1$ including the time $t_{PR}$ to the image encoding rate not exceeding the maximum transmission rate $B_{max}$ corresponding to the communication protocol B. The transmission packet generator 14 thins out a packet (for example, a data packet) of low importance among the transmission data packets, and outputs a packet (for example, a control packet) of high importance to the transmitter 17. The transmission packet generator 14 may thin out, for example, a P frame or a B frame as a packet of low importance among the transmission data packets, and may output, for example, an I frame as a packet of high importance to the transmitter 17.

Figure 10B:
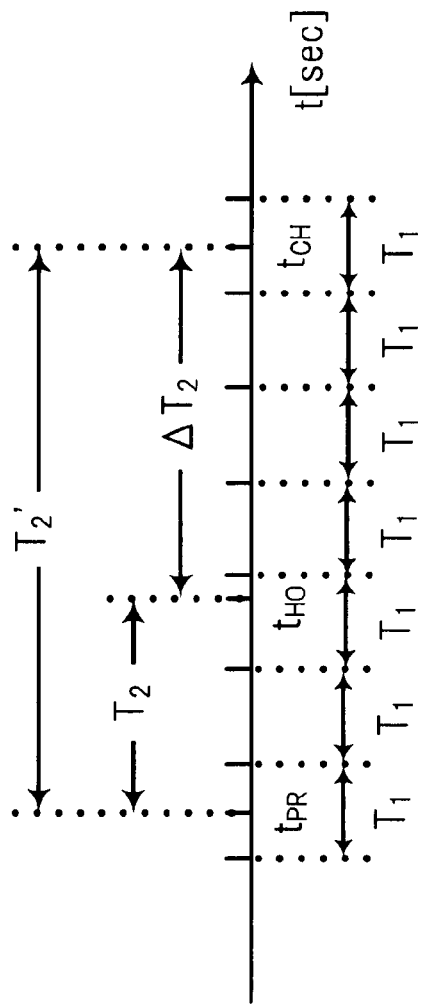
FIG. 10B is a diagram showing the relationship between the time $T_2$ and the variable minimum unit time $T_1$ of the image encoding rate when the time $T_2$ and the image encoding rate minimum unit time $T_1$ are little changed.

If the parameter k is, for example, 1 or 2, there is a case where the time $T_2$ necessary for the execution of the inter-RAT handover procedure and the image encoding rate minimum unit time $T_1$ are little changed (see FIG. 10B). FIG. 10B is a diagram showing the relationship between the time $T_2$ and the variable minimum unit time $T_1$ of the image encoding rate when the time $T_2$ and the image encoding rate minimum unit time $T_1$ are little changed. FIG. 10B shows an example where the parameter k=2.

Figure 11:
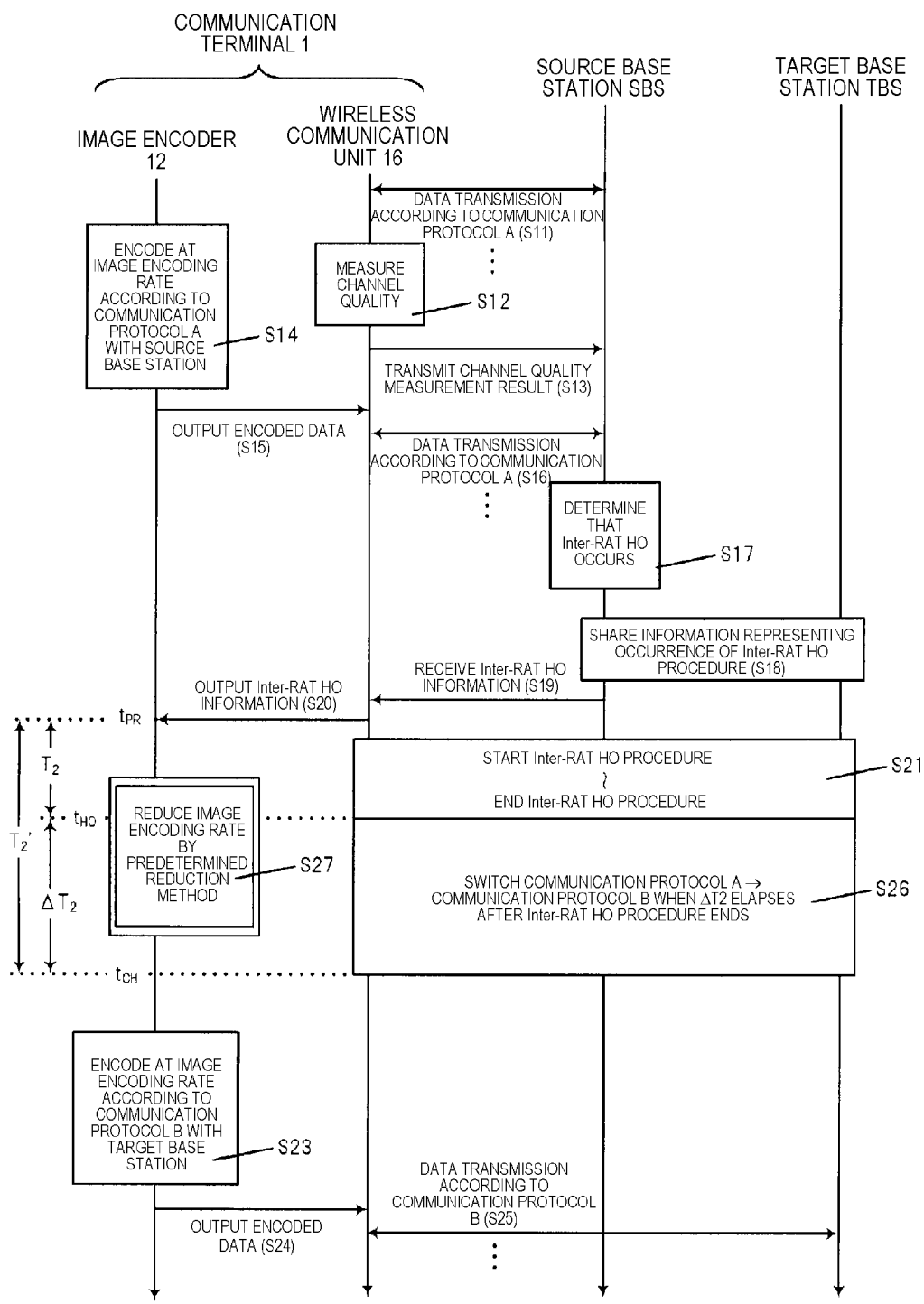
FIG. 11 is a sequence diagram illustrating exchange of signals relating to inter-RAT handover among a communication terminal, a source base station, and a target base station when the time $T_2$ from the time $t_{PR}$ to the time $t_{HO}$ and a variable minimum unit time $T_1$ of an image encoding rate are little changed.

As shown in FIG. 10B, when the time $T_2$ necessary for the execution of the inter-RAT handover procedure and the image encoding rate minimum unit time $T_1$ are little changed, as described referring to FIG. 7 or 8, the image encoder 12 may gradually reduce the image encoding rate until the extended time $\Delta T_2$ further elapses after the time $T_2$ elapses (see FIG. 11).

As shown in FIG. 10B, the extended time $\Delta T_2$ is a predetermined time from the time $t_{HO}$ to the time $t_{CH}$, and is the time from when the predetermined time ($\cong(t_{CH}-t_{HO})$) elapses after the inter-RAT handover protocol processing ends at $t_{HO}$ until the switching of the communication protocol from the communication protocol A to the communication protocol B ends. Accordingly, the image encoder 12 gradually reduces the image encoding rate toward the image encoding rate not exceeding the maximum transmission rate $B_{max}$ corresponding to the communication protocol B in a stepwise manner in accordance with the above-described first reduction method or the second reduction method for the total time $T_2'$ of the time $T_2$ and the extended time $\Delta T_2$. Accordingly, even when the time $T_2$ necessary for the execution of the inter-RAT handover procedure and the image encoding rate minimum unit time $T_1$ are little changed, the communication terminal 1 can gradually reduce the image encoding rate in a stepwise manner, can gradually reduce the amount of transmission data packets retained in the buffer 15, and can effectively reduce the probability of packet loss.

When the time $T_2$ necessary for the execution of the inter-RAT handover procedure and the image encoding rate minimum unit time $T_1$ are little changed, exchange of signals relating to inter-RAT handover among the communication terminal 1, the source base station SBS, and the target base station TBS will be described referring to FIG. 11. FIG. 11 is a sequence diagram illustrating exchange of signals relating to inter-RAT handover among the communication terminal, the source base station, and the target base station when the time $T_2$ from the time $t_{PR}$ to the time $t_{HO}$ and the variable minimum unit time $T_1$ of the image encoding rate are little changed.

In the mobile communication network 31, data transmission is performed according to the communication protocol A in the mobile communication network 31 is performed between the wireless communication unit 16 of the communication terminal 1 and the source base station SBS (S11). Though not shown in FIG. 11, the present invention is not limited to a case in Step S16 or Step S25 described below, and it is assumed that the same data transmission as Step S11 continues between the communication terminal 1 and the source base station SBS or the target base station TBS.

The channel quality measurement unit 18 of the wireless communication unit 16 measures channel quality relating to the communication channel of the communication protocol A on the basis of the reference signal received by the antenna Ant through the pilot channel (S12). The channel quality measurement unit 18 outputs the channel quality measurement result relating to the communication channel of the communication protocol A to the transmitter 17. The transmitter 17 transmits the channel quality measurement result output from the channel quality measurement unit 18 to the source base station SBS (S13).

The image encoder 12 determines the image encoding rate within a range not exceeding the maximum transmission rate $A_{max}$ corresponding to the communication protocol A in the mobile communication network 31 separately from the operation of the wireless communication unit 16 described in Steps S12 and S13, and encodes image data at the determined image encoding rate (S14). Encoded image data encoded by the image encoder 12 is added with an error correcting code by the error correcting code addition unit 13 and is generated by the transmission packet generator 14 as a transmission data packet, and the transmission data packet is stored in the buffer 15.

The transmission data packet stored in the buffer 15 is output from the buffer 15 to the transmitter 17 of the wireless communication unit 16 in the interval of the image encoding rate minimum unit time $T_1$ next to the interval of the encoded image encoding rate minimum unit time $T_1$ (S15). The transmitter 17 transmits the transmission data packet to the source base station SBS through the antenna Ant. That is, in the mobile communication network 31, data transmission according to the communication protocol A in the mobile communication network 31 is performed between the wireless communication unit 16 of the communication terminal 1 and the source base station SBS (S16).

The source base station SBS receives the channel quality measurement result or the transmission data packet transmitted from the transmitter 17 of the wireless communication unit 16. Here, the channel quality measurement result is assumed that, for example, the channel quality measurement result of the communication channel of the communication protocol A in the mobile communication network 31 provided by the source base station SBS is less than a predetermined threshold value and the channel quality measurement result of the communication channel of the communication protocol B in the mobile communication network 32 provided by the target base station TBS exceeds the same threshold value. In this case, the source base station SBS determines the switching of the communication protocol with the communication terminal 1 from the communication protocol A in the mobile communication network 31 provided by the source base station SBS to the communication protocol B in the mobile communication network 32 provided by the target base station TBS, that is, the occurrence of inter-RAT handover with respect to communication with the communication terminal 1 (S17).

After inter-RAT handover is determined, the source base station SBS transmits the occurrence of inter-RAT handover with respect to communication with the communication terminal 1 to the target base station TBS through the core network NW. That is, the occurrence of inter-RAT handover with respect to communication with the communication terminal 1 is shared between the source base station SBS and the target base station TBS (S18).

After the occurrence of inter-RAT handover with respect to communication with the communication terminal 1 is shared with the target base station TBS, the source base station SBS generates inter-RAT handover information and transmits the inter-RAT handover information to the communication terminal 1 (S19). The receiver 19 of the wireless communication unit 16 outputs the inter-RAT handover information to the image encoder 12 (S20).

After the inter-RAT handover information is generated and transmitted to the communication terminal 1, the source base station SBS executes the inter-RAT handover procedure among the communication terminal 1, the source base station SBS, and the target base station TBS (S21). The inter-RAT handover procedure starts at the time $t_{PR}$ and ends at the time $t_{HO}$. If the execution of the inter-RAT handover procedure ends, the communication protocol is switched from the communication protocol A to the communication protocol B among the wireless communication unit 16, the source base station SBS, and the target base station TBS when the predetermined extended time $\Delta T_2$ elapses (S26). In this case, the connection base station of the communication terminal 1 becomes the target base station TBS, and the communication protocol, for which the communication terminal 1 is allocated to be usable, becomes the communication protocol B.

The image encoder 12 reduces the image encoding rate to the image encoding rate not exceeding the maximum transmission rate $B_{max}$ corresponding to the communication protocol B before the total time $T_2'$ of the time $T_2$ necessary for the execution of the inter-RAT handover procedure and the predetermined extended time $\Delta T_2$ elapses until the execution of the inter-RAT handover procedure among the wireless communication unit 16, the source base station SBS, and the target base station TBS ends and the predetermined extended time $\Delta T_2$ elapses with the time $t_{PR}$, at which the inter-RAT handover information is acquired, as the starting point (S27). A reduction method of the image encoding rate in Step S27 is the same as the reduction method described referring to FIG. 4, 7, or 8, thus description thereof will not be repeated.

After the time $t_{CH}$ at which the predetermined extended time $\Delta T_2$ ends, the image encoder 12 encodes image data at the image encoding rate not exceeding the maximum transmission rate $B_{max}$ corresponding to the communication protocol B in the mobile communication network 32 (S23). Encoded image data encoded by the image encoder 12 is added with an error correcting code by the error correcting code addition unit 13 and is generated by the transmission packet generator 14 as a transmission data packet, and the transmission data packet is stored in the buffer 15.

The transmission data packet stored in the buffer 15 is output from the buffer 15 to the transmitter 17 of the wireless communication unit 16 in the interval of the image encoding rate minimum unit time $T_1$ next to the interval of the encoded image encoding rate minimum unit time $T_1$ (S24). The transmitter 17 transmits the transmission data packet to the source base station SBS through the antenna Ant. That is, in the mobile communication network 32, data transmission according to the communication protocol B in the mobile communication network 32 is performed between the wireless communication unit 16 of the communication terminal 1 and the target base station TBS (S25).

The extended time $\Delta T_2$ is introduced such that the image encoding rate reliably matches the image encoding rate equal to or lower than the maximum transmission rate of the communication protocol B, thereby delaying the switching timing from the communication protocol A to the communication protocol B. When the inter-RAT handover protocol processing is performed in the communication terminal 1, the communication terminal 1 may not respond to communication from the source base station SBS quickly, may delay the response time to the base station to extend the inter-RAT handover protocol processing time $T_2$, and may delay the switching timing from the communication protocol A to the communication protocol B, such that the image encoding rate reliably matches the image encoding rate equal to or lower than the maximum transmission rate of the communication protocol B.

The present invention may be useful as a communication terminal and an encoding rate reduction control method capable of reducing the probability of packet loss caused by data packet retention in a buffer even after the execution of a handover procedure to a mobile communication network having a transmission rate available for data transmission lower than a current transmission rate.

The present application is a continuation-in-part of PCT application No. PCT/JP2011/005861 filed on Oct. 19, 2011, the contents of which are incorporated herein by reference in its entirety.

What is claimed is:

1. A communication terminal to be connected to a first base station performing communication by a first communication protocol at a first communication rate and a second base station performing communication by a second communication protocol different from the first communication protocol, the second communication protocol communicating at a second communication rate lower than the first communication rate, the communication terminal comprising:
- a communication unit which can communicate with the first base station and the second base station; and
- an encoder which encodes data at a first encoding rate determined according to the first communication protocol or at a second encoding rate determined according to the second communication protocol for each predetermined time and outputs the encoded data to the communication unit, the second encoding rate being lower than the first encoding rate, wherein,
- when a connection destination is to be changed from the first base station to the second base station in a period when the communication unit is connected to the first base station, the communication unit outputs change information including information relating to the second base station and representing a change of connection from the first base station to the second base station to the encoder before the change of the connection to the second base station is completed, and
- the encoder decreases an encoding rate from the first encoding rate to the second encoding rate in a stepwise manner after acquiring the change information and before the change of the connection to the second base station is completed, and
- the communication terminal delays a timing of completion of the change of the connection from the first base station to the second base station until after the decrease of the encoding rate from the first encoding rate to the second encoding rate in a stepwise manners is completed.

2. The communication terminal according to claim 1, wherein the communication unit transmits the change information to the encoder when a procedure for changing the connection destination from the first base station to the second base station starts.

3. The communication terminal according to claim 1, wherein the change information further includes a time required for the change from the first base station to the second base station.

4. The communication terminal according to claim 1, wherein the communication unit switches communication from the first base station to the second base station when a predetermined time elapses after a procedure for the change from the first base station to the second base station ends.

5. The communication terminal according to claim 1, wherein
- first and second maximum transmission rates are determined as amounts of transmittable data allocated to the communication terminal corresponding to the first and second base stations, respectively, and
- the encoder gradually reduces the encoding rate from a value less than the first maximum transmission rate to a value less than the second maximum transmission rate for each variable minimum unit time of the encoding rate.

6. The communication terminal according to claim 1, wherein the encoder gradually reduces the encoding rate for each variable minimum unit time based on a round trip time of each interval of a variable minimum unit time of the encoding rate and a maximum transmission rate which is an amount of transmittable data allocated to the communication terminal corresponding to the second base station.

7. A communication terminal to be connected to a communication unit which can communicate with a first base station performing communication by first communication protocol at a first communication rate and a second base station performing communication by a second communication protocol different from the first communication protocol, the second communication protocol communicating at a second communication rate lower than the first communication rate, the communication terminal comprising:
- an encoder which encodes data at a first encoding rate determined according to the first communication protocol or at a second encoding rate determined according to the second communication protocol for each predetermined time and outputs the encoded data to the communication unit, the second encoding rate being lower than the first encoding rate, wherein,
- the encoder decreases an encoding rate from the first encoding rate to the second encoding rate in a stepwise manner after receiving change information including information relating to the second base station and representing a change of the connection from the first base station to the second base station and before the change of the connection to the second base station is completed, and
- the communication terminal delays a timing of completion of the change of connection from the first base station to the second base station Until after the decrease of the encoding rate from the first encoding rate to the second encoding rate in a stepwise manner is completed.

8. An encoding rate reduction method for a communication terminal to be connected to a first base station performing communication by a first communication protocol at a first communication rate and a second base station performing a communication by second communication protocol different from the first communication protocol, the second communication protocol communicating at a second communication rate lower than the first communication rate, the communication terminal including a communication unit which can communicate with the first base station and the second base station and an encoder which encodes data at a first encoding rate determined according to the first communication protocol or at a second encoding rate determined according to the second communication protocol for each predetermined time and outputs the encoded data to the communication unit, the second encoding rate being lower than the first encoding rate, the encoding rate reduction method comprising:
- causing the communication unit, when a connection destination is to be changed from the first base station to the second base station in a period when the communication unit is connected to the first base station, to output to the encoder change information including information relating to the second base station and representing a change of connection from the first base station to the second base station before the change of the connection to the second base station is completed; and
- causing the encoder, after receiving the change information, to decrease an encoding rate from the first encoding rate to the second encoding rate in a stepwise manner before the change of the connection to the second base station is completed, wherein the communication terminal delays a timing of completion of the change of connection from the first base station to the second base station until after the decrease of the encoding rate from the first encoding rate to the second encoding rate in a stepwise manner is completed.

9. An encoding rate reduction method for a communication terminal to be connected to a communication unit which can communicate with a first base station performing communication by a first communication protocol at a first communication rate and a second base station performing communication by a second communication protocol different from the first communication protocol, the second communication protocol communicating at a second communication rate lower than the first communication rate, the communication terminal including an encoder which encodes data at a first encoding rate determined according to the first communication protocol or at a second encoding rate determined according to the second communication protocol for each predetermined time and outputs the encoded data to the communication unit, the second encoding rate being lower than the first encoding rate, the encoding rate reduction method comprising:

causing the encoder, after receiving change information including information relating to the second base station and representing a change of the communication unit from the first base station to the second base station, to decrease an encoding rate from the first, encoding rate to the second encoding rate in a stepwise manner before the change of the connection to the second base station is completed, wherein the communication terminal delays a timing of completion of the change of connection from the first base station to the second base station until after the decrease of the encoding rate from the first encoding rate to the second encoding rate in a stepwise manner is completed.

10. The communication terminal according to claim 1, wherein the encoder decreases the encoding rate from the first encoding rate which is less than the first communication rate to the second encoding rate which is less than the second communication rate in a stepwise manner after acquiring the change information and before the change of the connection to the second base station is completed.

\* \* \* \* \*